United States Patent [19]
Yoshiura et al.

[11] Patent Number: 5,907,669
[45] Date of Patent: May 25, 1999

[54] IMAGE FORMING SYSTEM HAVING A PLURALITY OF IMAGE FORMING APPARATUSES FOR DISTRIBUTED PRINTING

[75] Inventors: Syoichiro Yoshiura, Tenri; Hidetomo Nishiyama, Yamatokoriyama; Yasuhiro Nakai, Soraku-gun, all of Japan

[73] Assignee: Sharp Kabushiki Kaisha, Osaka, Japan

[21] Appl. No.: 08/800,648

[22] Filed: Feb. 4, 1997

[30] Foreign Application Priority Data

Mar. 18, 1996 [JP] Japan .................................. 8-061428

[51] Int. Cl.⁶ .......................... B41B 15/00; G06F 13/00; G06F 15/00; B41J 15/00
[52] U.S. Cl. .......................... 395/115; 395/101; 395/837; 399/8; 358/296; 358/401
[58] Field of Search .................................... 358/296, 401, 358/425, 434, 435, 436, 438, 439, 442, 468, 448; 399/8; 355/89; 395/101, 114, 115, 837; 346/44; 347/2, 3

[56] References Cited

U.S. PATENT DOCUMENTS

| | | | |
|---|---|---|---|
| 4,797,706 | 1/1989 | Sugishima et al. | 358/448 |
| 5,136,399 | 8/1992 | Aoyama | 358/295 |
| 5,564,109 | 10/1996 | Snyder et al. | 395/828 |
| 5,689,755 | 11/1997 | Ataka | 399/8 |

FOREIGN PATENT DOCUMENTS

| | | |
|---|---|---|
| 0 545 261 A1 | 6/1993 | European Pat. Off. . |
| 195 18 321 A1 | 12/1995 | Germany . |
| 53116834 | 10/1978 | Japan . |

*Primary Examiner*—Kim Yen Vu
*Assistant Examiner*—Kimberly A. Williams
*Attorney, Agent, or Firm*—David G. Conlin; Peter J. Manus

[57] ABSTRACT

An image forming system has a plurality of image forming apparatuses that are operatively connected so as to communicate image information with each other. Some of the image forming apparatuses carry out image processing in a distributed manner with respect to image information that has been inputted to one of the image forming apparatuses and corresponds to a plurality of pages. Such some image forming apparatuses carry out the image processing for every predetermined pages of the image information in parallel and within processing capacity levels of such some image forming apparatuses. The processing capacity levels fall within a permissible range. Such an arrangement causes (1) to shorten the time required for processing to be carried out within the image forming system and (2) for the image-processed image information to be substantially the same level over the entire pages.

17 Claims, 23 Drawing Sheets

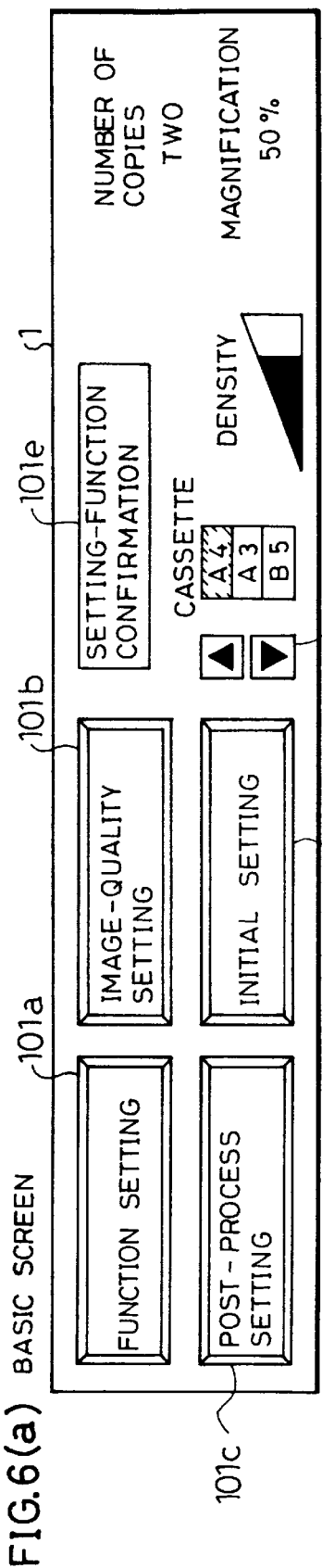
FIG.6(a) BASIC SCREEN
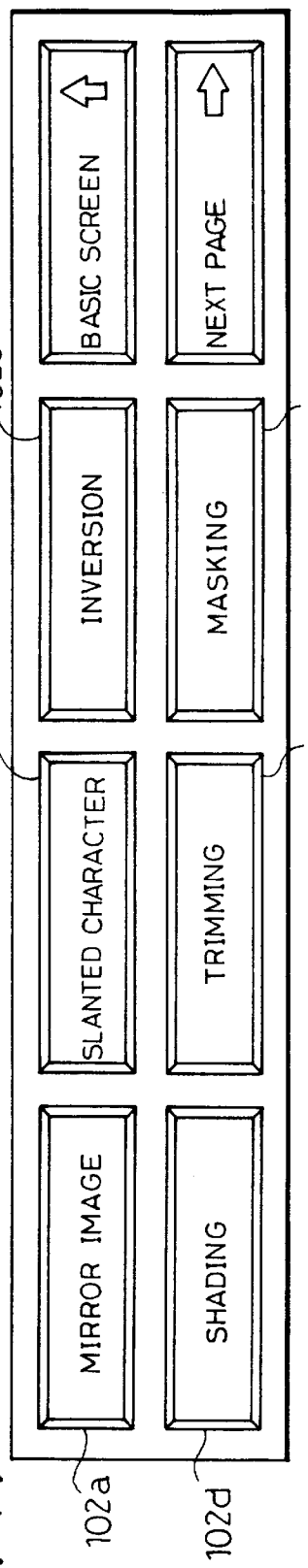
FIG.6(b) FIRST-FUNCTION SETTING SCREEN
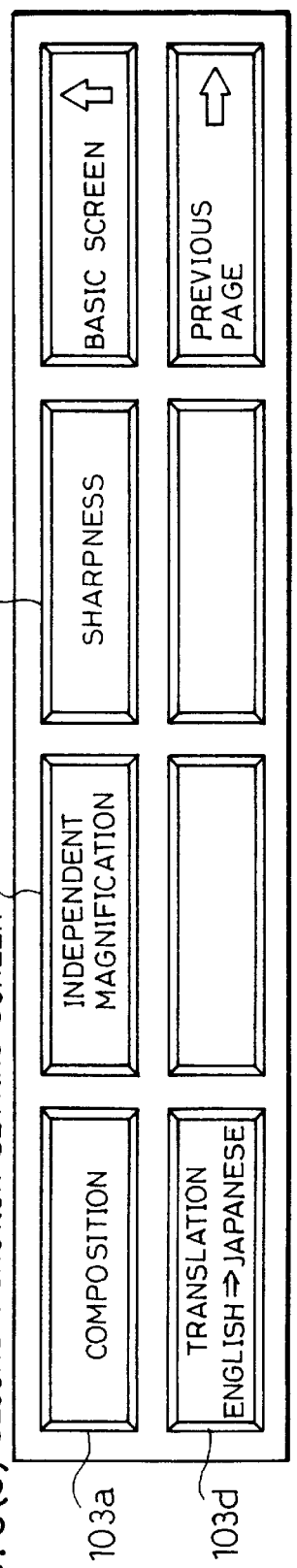
FIG.6(c) SECOND-FUNCTION SETTING SCREEN

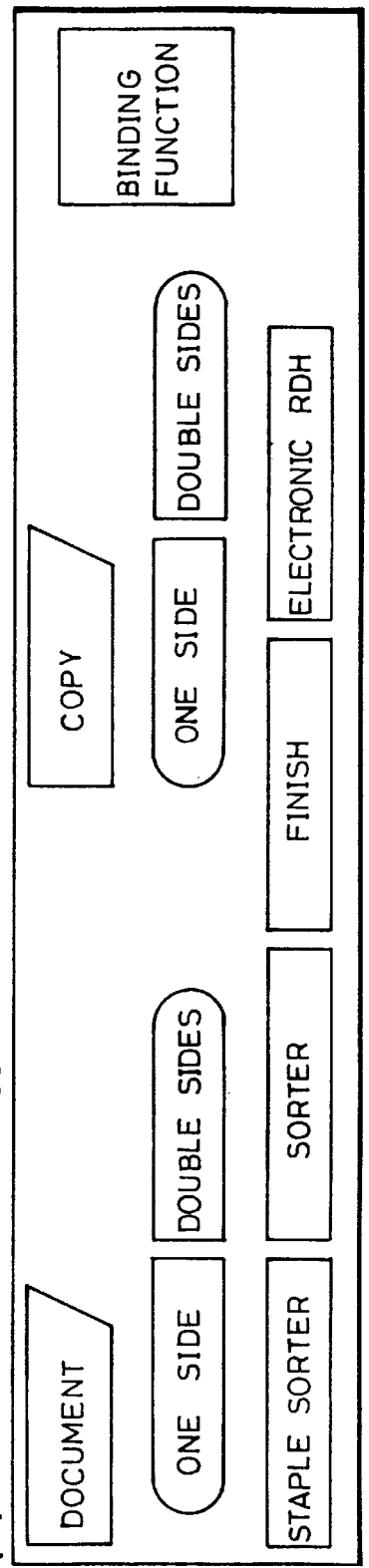
FIG.7(a) IMAGE QUALITY SETTING SCREEN
FIG.7(b) POST-PROCESS SETTING SCREEN

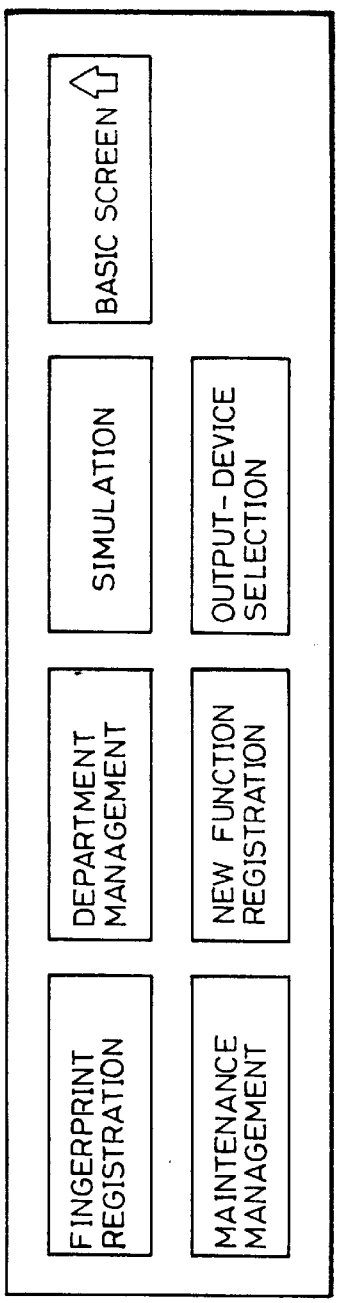
FIG.8(a) INITIAL SETTING SCREEN
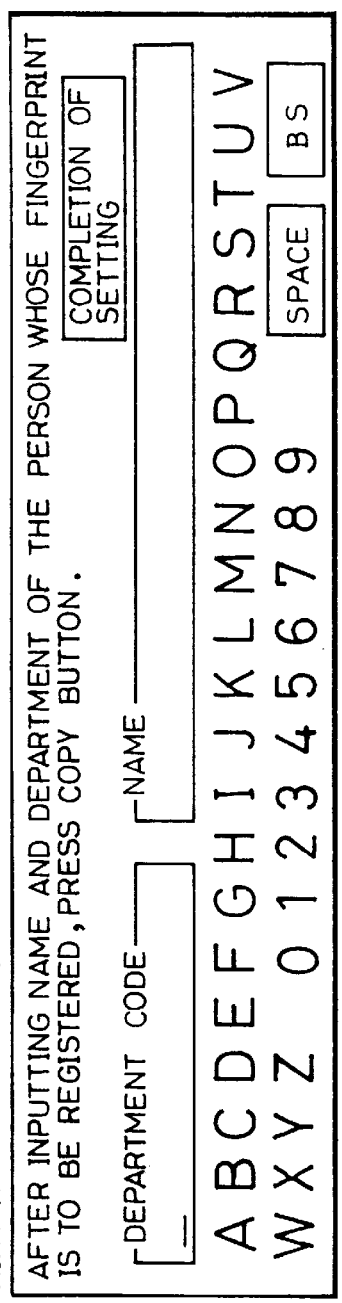
FIG.8(b) FINGERPRINT REGISTERING SCREEN
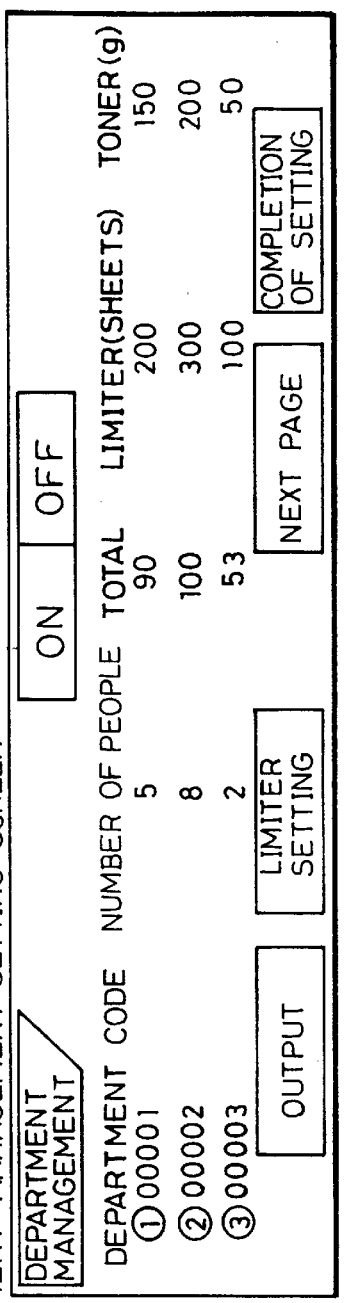
FIG.8(c) DEPARTMENT-MANAGEMENT SETTING SCREEN

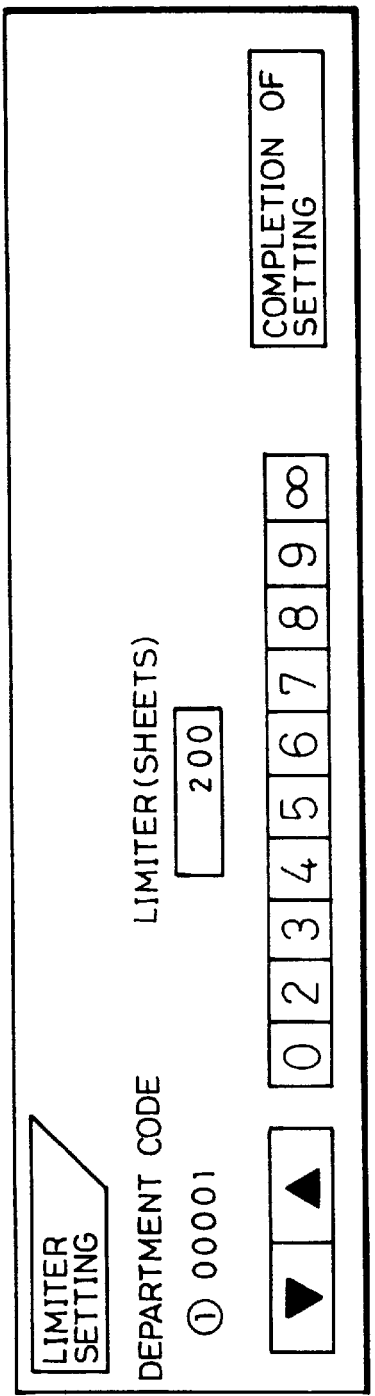
FIG. 9(a) LIMITER SETTING SCREEN
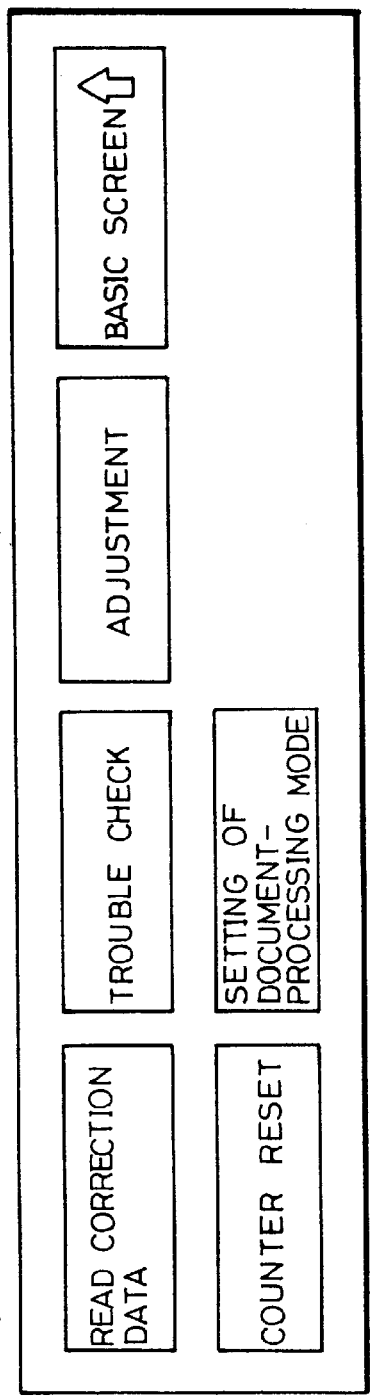
FIG. 9(b) SIMULATION SCREEN

IMAGE FORMING SYSTEM HAVING A PLURALITY OF IMAGE FORMING APPARATUSES FOR DISTRIBUTED PRINTING

FIELD OF THE INVENTION

The present invention relates to an image forming system in which a plurality of image forming apparatuses such as digital copying machines are operatively connected with each other through a communication apparatus.

BACKGROUND OF THE INVENTION

A digital copying machine, for example, has been commercialized as an image forming apparatus. According to the digital copying machine, when copying a document image, the document image is read by an image reading section. With respect to thus read document image, a specified image process is carried out by an image processing section. Then, image information in accordance with the specified image process is printed out by a recording section. Thus, according to such a digital copying machine, an image is copied onto a sheet of paper by using only the image processing functions that are provided in the digital copying machine.

In recent years, it has been proposed that a plurality of image recording apparatuses or other apparatuses be organized into a network. For example, unexamined Japanese Patent Publication No. 116834/1978 (Tokukaishou 53-116834) discloses an arrangement wherein a plurality of image reading apparatuses and a plurality of image recording apparatuses are connected through a control section. In such an arrangement, a document image that has been read by any of the image reading apparatuses is recorded, i.e., is printed by any of the image recording apparatuses.

Examined Japanese Patent Publication No. 36592/1995 (Tokukouhei 7-36592) discloses an image forming system wherein a plurality of copying machines, each having an image reading section and an image recording section, are connected to a control device. In such an image forming system, an image signal that is to be recorded is supplied to the copying machines in a distributed manner in accordance with a document copying mode that has been set, and copying operations are carried out by the copying machines in parallel with one another.

However, the conventional image forming systems have the following problems.

It is assumed that an image forming system has a plurality of digital copying machines. When carrying out the image process by use of a specified digital copying machine among the digital copying machines, the time required for the image process changes depending on the types of the image process or on the amount of image information to be image-processed.

Further, various image processing functions in the digital copying machine are dependent upon software. Here, with the recent remarkable developments of the software, the image processing functions have been highly improved in a very short period, and new copying machines having additional unprecedented functions have been newly introduced into the market. Consequently, for example, even when a digital copying machine having desired image processing functions is purchased, the digital copying machine, which has the highest image processing functions at the time of the purchase, will soon become outdated with relatively low functions in a short period.

In this case, it is impossible for the purchased digital copying machine to obtain functions higher than those originally provided in the digital copying machine. In the case where higher functions or newer functions are required, it is inevitable that a new copying machine has to be purchased to replace the older one. This tends to impose a big burden on users on an economic basis, and also to present an inherent problem for makers that try to provide consumers with new merchandise.

SUMMARY OF THE INVENTION

It is an object of the present invention to provide an image forming system (1) which can carry out a variety of image processings with respect to image information without imposing a big burden on users on an economic basis and (2) which can carry out image processing with respect to image information to be processed over the entire pages without giving unnatural feelings to the users.

In order to achieve the foregoing object, the first image forming system in accordance with the present invention is characterized by the following arrangement. More specifically, according to the arrangement, the first image forming system is provided with:

a plurality of image forming apparatuses (for example digital copying machines); and a communication apparatus, wherein the plurality of image forming apparatuses are operatively connected so as to communicate image information with each other through the communication apparatus, and some of the image forming apparatuses carry out image processing in a distributed manner with respect to image information that has been inputted to one of the image forming apparatuses and corresponds to a plurality of pages, the some image forming apparatuses carrying out the image processing for every predetermined pages of the image information in parallel and within processing capacity levels of the some image forming apparatuses, the processing capacity levels falling within a permissible range.

With the arrangement, image information that corresponds to a plurality of pages is inputted to one of the image forming apparatuses that constitute an image forming system. When receiving instructions to carry out a predetermined image processing with respect to the image information, some of the image forming apparatuses carry out the image processing in a distributed manner with respect to the image information for every predetermined pages of the image information in parallel and within processing capacity levels of the some image forming apparatuses, the processing capacity levels falling within a permissible range.

As mentioned above, according to the first image forming system, since a predetermined image processing is carried out with respect to image information by a plurality of image forming apparatuses in parallel, such an image processing can be quickly carried out.

Further, the foregoing image processing is carried out within processing capacity levels of some image forming apparatuses, the processing capacity levels falling within a permissible range. Accordingly, when outputting the image information that has been processed to a display apparatus or to a sheet of paper through a recording apparatus such as a printer, it is possible to obtain images having substantially the same processing capacity level. Therefore, it is avoidable to give unnatural feelings to the person who watches the outputted image of the image information.

The second image forming system in accordance with the present invention is characterized by being provided with:

a first image forming apparatus;

a plurality of second image forming apparatuses;

a communication apparatus that operatively connects the first image forming apparatus and the second image forming apparatuses so as to communicate image information with each other; and a memory apparatus that stores image processing information and image processing capacity information, the image processing information indicative of which types of image processing the second image forming apparatuses can carry out, the image processing capacity information indicative of processing capacity levels of the image processing, wherein the first image forming apparatus includes:

an image output section that provides a visualized image in accordance with the image information;

an input section through which instructions with regard to the image processing are inputted; and a first control section that (1) specifies in accordance with the image processing information and the image processing capacity information, with respect to an image processing that has been instructed by the input section, a permissible range of the processing capacity levels common to the second image forming apparatuses, (2) divides the image information for the specified second image forming apparatuses and adds a control information to each divided image information, the control information indicative of the processing capacity level that has been instructed and which type of image processing should be carried out, (3) transmits each of the divided image information to each of the second image forming apparatuses separately through the communication apparatus, and (4) sends to the image output section image information that has been processed and returned by each of the second image forming apparatuses, and each of the second image forming apparatuses includes:

an image processing section that carries out, with respect to image information, the image processing that has been specified in accordance with the control information with the processing capacity level that falls within the permissible range specified by the first control section;

a second control section that (1) sends to the image processing section the image information that has been inputted through the communication apparatus, and (2) returns through the communication apparatus to the first image forming apparatus the image information that has been processed by the image processing section.

With the arrangement, when instructions relating to image processing is inputted to the input section, the first control section of the first image forming apparatus specifies in accordance with the image processing information and the image processing capacity information a permissible range of the processing capacity levels common to the second image forming apparatuses. The first control section divides the image information for the specified second image forming apparatuses and adds the control information to each divided image information, the control information indicative of the processing capacity level that has been instructed and which type of image processing should be carried out. The first control section transmits each of the divided image information to each of the second image forming apparatuses separately through the communication apparatus.

When receiving image information from the first image forming apparatus through the communication apparatus, the second image forming apparatus sends the image information to the image processing section. The image processing section carries out, with respect to image information, the image processing that has been specified in accordance with the control information with the processing capacity level that falls within the permissible range specified by the first control section. Through the communication apparatus, the image information that has been processed by the image processing section is returned to the first image forming apparatus.

When receiving the image information that has been image-processed, the first control section of the first image forming apparatus sends it to the image output section, thereby resulting in that the image information that has been processed is visualized by the image output section of the first image forming apparatus.

As mentioned above, according to the second image forming system, since a predetermined image processing is carried out in parallel by a plurality of second image forming apparatuses, such an image processing can be quickly carried out.

Further, the foregoing image processing is carried out within processing capacity levels of the second image forming apparatuses, the processing capacity levels falling within a permissible range. Accordingly, when outputting the image information that has been processed to a display apparatus or to a sheet of paper through a recording apparatus such as a printer, it is possible to obtain images having substantially the same processing capacity level. Therefore, it is avoidable to give unnatural feelings to the person who watches the outputted image of the image information.

Moreover, even in the case where the image processing functions that the operator intends to are not provided in the first image forming apparatus that the operator operates, such an image processing can be carried out by other image forming apparatuses, i.e., by the second image forming apparatuses. Accordingly, it is not necessary for each image forming apparatus to have separately predetermined image processing functions therein, thereby causing to reduce an economical burden of the user who uses such an image forming apparatus.

The third image forming system in accordance with the present invention is characterized by being provided with:

a first image forming apparatus;

at least one second image forming apparatuses;

a communication apparatus that operatively connects the first image forming apparatus and the second image forming apparatuses so as to communicate image information with each other; and a memory apparatus that stores image processing information and image processing capacity information, the image processing information indicative of which types of image processing the first and second image forming apparatuses can carry out, the image processing capacity information indicative of processing capacity levels of the image processing, wherein the first image forming apparatus includes:

a first image processing section that carries out, with respect to image information, the image processing that has been specified in accordance with control information with the processing capacity level that falls within the permissible range specified by the first control section;

an image output section that provides a visualized image in accordance with the image information;

an input section through which instructions with regard to the image processing are inputted; and a first control section that (1) specifies in accordance with the image processing information and the image processing capacity information, with respect to an image processing that has been instructed by the input section, a permissible range of the processing capacity levels common to the first and second image forming apparatuses, (2) divides the image information for image forming apparatuses that carry out the image processing and adds a control information to each divided image information, the control information indicative of the processing capacity level that has been instructed and which type of image processing should be carried out, (3) transmits one part of the divided image information to the first image processing section while transmits the remainder of the divided image information to the second image forming apparatuses through the communication apparatus, and (4) sends to the image output section (a) image information that has been processed and returned by each of the second image forming apparatuses and (b) image information that has been processed by the first image processing section, and each of the second image forming apparatuses includes:
a second image processing section that carries out, with respect to image information, the image processing that has been specified in accordance with the control information with the processing capacity level that falls within the permissible range specified by the first control section;
a second control section that (1) sends to the second image processing section the image information that has been inputted through the communication apparatus, and (2) returns through the communication apparatus to the first image forming apparatus the image information that has been processed by the second image processing section.

With the arrangement, when instructions relating to image processing is inputted to the input section, the first control section of the first image forming apparatus specifies in accordance with the image processing information and the image processing capacity information a permissible range of the processing capacity levels common to the first and second image forming apparatuses. The first control section divides the image information for the specified image forming apparatuses and adds the control information to each divided image information, the control information indicative of the processing capacity level that has been instructed and which type of image processing should be carried out. The first control section transmits one part of the divided image information to the first image processing section while transmits the remainder of the divided image information to the second image forming apparatuses through the communication apparatus.

The first image processing section of the first image forming apparatus carries out, with respect to image information thus supplied, the image processing that has been specified in accordance with the control information with the processing capacity level that falls within the permissible range specified by the first control section.

When receiving image information from the first image forming apparatus through the communication apparatus, the second image forming apparatus sends the image information to the image processing section. Similarly, the image processing section carries out, with respect to image information, the image processing that has been specified in accordance with the control information with the processing capacity level that falls within the permissible range specified by the first control section. Through the communication apparatus, the image information that has been processed by the image processing section is returned to the first image forming apparatus.

The first control section of the first image forming apparatus sends to the image output section the image information that has been processed by the first image processing section and the image information that has been returned from the second image forming apparatus, thereby resulting in that the image information that has been processed is visualized by the image output section of the first image forming apparatus.

As mentioned above, according to the third image forming system, since a predetermined image processing is carried out in parallel by the first and second image forming apparatuses, such an image processing can be quickly carried out.

Further, the foregoing image processing is carried out within processing capacity levels of the first and second image forming apparatuses, the processing capacity levels falling within a permissible range. Accordingly, when outputting the image information that has been processed to a display apparatus or to a sheet of paper through a recording apparatus such as a printer, it is possible to obtain images having substantially the same processing capacity level. Therefore, it is avoidable to give unnatural feelings to the person who watches the outputted image of the image information. According to the third image forming system, the image processing is carried out by the first image forming apparatus itself which requests other image forming apparatuses in a distributed manner. Therefore, as to the image information to be processed inside the first image forming apparatus, it is not necessary to transmit and receive to and from other image forming apparatuses. This causes (1) to shorten the time required for the processing, i.e., to save the time required for communications therebetween and (2) to simplify the communication operations.

In the foregoing second and third image forming systems, the first control section of the first image forming apparatus may be arranged so as to specify, among the processing capacity levels, a lowest one as the processing capacity level of the control information common to the second image forming apparatuses for the second image forming system while common to the first and second image forming apparatuses for the third image forming system with respect to the image processing that has been instructed by the input section.

In the image forming apparatus having a processing capacity level higher than the lowest one, the image processing that has been instructed to carry out, i.e., an image processing with the lowest processing capacity level can be carried out. Accordingly, with the arrangement, the foregoing image processing can be carried out by a variety of image forming apparatuses.

In the foregoing second and third image forming systems, the first control section of the first image forming apparatus may be arranged so as to specify the processing capacity level of the control information in accordance with an output capacity level of the image output section of the first image forming apparatus.

With the arrangement, it is possible (1) to handle the image information of the image output section, that visualizes the image information that has been image-processed, of the first image forming apparatus and (2) to obtain a good visualized image.

More specifically, when the processing capacity level of the control information is specified in accordance with an output capacity level of the image output section of the first image forming apparatus, the image information that has been image-processed corresponds to the image processing section of the first image forming apparatus, i.e., corresponds to an output of the image processing section. Accordingly, it is possible (1) for the image processing section to output the image information as it is and (2) for the image output section to output a good image.

Further, it is avoided that some image processings are carried out for a long time with a high processing level that exceeds the output capacity of an image forming apparatus that has requested other image forming apparatuses to carry out them in a distributed manner. Therefore, it is avoidable that the image processings with such a high processing level become wasteful.

The fourth image forming system in accordance with the present invention is characterized by being provided with:

a first image forming apparatus;

a plurality of second image forming apparatuses;

a communication apparatus that operatively connects the first image forming apparatus and the second image forming apparatuses so as to communicate image information with each other; and a memory apparatus that stores image processing information and image processing capacity information, the image processing information indicative of which types of image processing the second image forming apparatuses can carry out, the image processing capacity information indicative of processing capacity levels of the image processing, wherein the first image forming apparatus includes:

an image output section that provides a visualized image in accordance with the image information;

an input section through which instructions with regard to the image processing are inputted; and a first control section that (1) selects, in accordance with the image processing information and the image processing capacity information, some of the second image forming apparatuses that can carry out an image processing that has been instructed by the input section with the processing capacity levels falling within a permissible range, (2) divides the image information for the selected second image forming apparatuses and transmits each of the divided image information to each of the selected second image forming apparatuses separately through the communication apparatus, and (3) sends to the image output section image information that has been processed and returned by each of the selected second image forming apparatuses, and each of the second image forming apparatuses includes:

an image processing section that carries out an image processing with respect to image information;

a second control section that (1) sends to the image processing section the image information that has been inputted through the communication apparatus, and (2) returns through the communication apparatus to the first image forming apparatus the image information that has been processed by the image processing section.

With the arrangement, when instructions relating to image processing is inputted to the input section, the first control section of the first image forming apparatus specifies, in accordance with the image processing information and the image processing capacity information, some of the second image forming apparatuses that can carry out an image processing that has been instructed by the input section with the processing capacity levels falling within a permissible range. The first control section divides the image information for the specified second image forming apparatuses. The first control section separately transmits each of the divided image information to the specified second image forming apparatuses through the communication apparatus.

When receiving image information from the first image forming apparatus, the second image forming apparatus sends the image information to the image processing section. The image processing section carries out, with respect to image information, a predetermined image processing. Through the communication apparatus, the image information that has been processed by the image processing section is returned to the first image forming apparatus by the second control section.

When receiving the image information that has been processed, the first control section of the first image forming apparatus sends to the image output section the image information, thereby resulting in that the image information that has been processed is visualized by the image output section of the first image forming apparatus.

As mentioned above, according to the fourth image forming system, since a predetermined image processing is carried out in parallel by the second image forming apparatuses, such an image processing can be quickly carried out.

Further, the foregoing image processing is carried out within processing capacity levels of the second image forming apparatuses (i.e., within substantially the same processing capacity level), the processing capacity levels falling within a permissible range. Accordingly, when outputting the image information that has been processed to a display apparatus or to a sheet of paper through a recording apparatus such as a printer, it is possible to obtain images having substantially the same processing capacity level. Therefore, it is avoidable to give unnatural feelings to the person who watches the outputted image of the image information.

Moreover, even in the case where the image processing functions that the operator intends to are not provided in the first image forming apparatus that the operator operates, such an image processing can be carried out by other image forming apparatuses, i.e., by the second image forming apparatuses. Accordingly, it is not necessary for each image forming apparatus to have separately predetermined image processing functions therein, thereby causing to reduce an economical burden of the user who uses such an image forming apparatus.

According to the fourth image forming system, it is necessary to specify some of the second image forming apparatuses that are requested to carry out the foregoing distributed image processing, while it is not necessary to convert the processing capacity levels in the specified second image forming apparatuses.

The fifth image forming system in accordance with the present invention is characterized by being provided with:

a first image forming apparatus;

a plurality of second image forming apparatuses;

a communication apparatus that operatively connects the first image forming apparatus and the second image forming apparatuses so as to communicate image information with each other; and a memory apparatus that stores image processing information and image processing capacity information, the image processing information indicative of which types of image processing the first and second image forming apparatuses can carry out, the image processing capacity information indicative of processing capacity levels of the image processing, wherein the first image forming apparatus includes:

an image output section that provides a visualized image in accordance with the image information;

a first image processing section that carries out image processing with respect to the image information;

an input section through which instructions with regard to the image processing are inputted; and a first control section that (1) selects, in accordance with the image processing information and the image processing capacity information, at least one of the second image forming apparatuses that can carry out an image processing that has been instructed by the input section with processing capacity levels falling within a permissible range of a processing level that the first image processing section has, (2) divides the image information for the first image forming apparatuses and the selected second image forming apparatuses and transmits one part of the divided image information to the first image processing section while transmits the remainder of the divided image information to the selected second image forming apparatuses through the communication apparatus, and (3) sends to the image output section (a) image information that has been processed and returned by each of the selected second image forming apparatuses and (b) image information that has been processed by the first image processing section, and each of the second image forming apparatuses includes:

a second image processing section that carries out an image processing with respect to image information;

a second control section that (1) sends to the second image processing section the image information that has been inputted through the communication apparatus, and (2) returns through the communication apparatus to the first image forming apparatus the image information that has been processed by the second image processing section.

With the arrangement, when instructions relating to image processing is inputted to the input section, the first control section of the first image forming apparatus selects at least one second image forming apparatuses that can carry out an image processing that has been instructed by the input section with processing capacity levels falling within a permissible range of a processing level that the first image processing section has. The first control section divides the image information for the first image forming apparatuses and the selected second image forming apparatuses and transmits one part of the divided image information to the first image processing section of the first image forming apparatus while transmits the remainder of the divided image information to the selected second image forming apparatuses through the communication apparatus.

When receiving image information, the first image processing section of the first image forming apparatus carries out a predetermined image processing with respect to the received image information.

When receiving image information from the first image forming apparatus through the communication apparatus, the second image forming apparatus sends the image information to the second image processing section. Similarly, the second image processing section carries out the predetermined image processing with respect to the image information. Through the communication apparatus, the image information that has been processed by the image processing section is returned to the first image forming apparatus by the second control section.

The first control section of the first image forming apparatus sends to the image output section (a) the image information that has been processed by the first image processing section and (b) the image information that has been returned from the second image forming apparatuses, thereby resulting in that the image information that has been processed is visualized by the image output section of the first image forming apparatus.

As mentioned above, according to the fifth image forming system, since a predetermined image processing is carried out in parallel by a plurality of image forming apparatuses such as the first and second image forming apparatuses, such an image processing can be quickly carried out.

Further, the foregoing image processing is carried out within processing capacity levels of the first and second image forming apparatuses (i.e., within substantially the same processing capacity level), the processing capacity levels falling within a permissible range. Accordingly, when outputting the image information that has been processed to a display apparatus or to a sheet of paper through a recording apparatus such as a printer, it is possible to obtain images having substantially the same processing capacity level. Therefore, it is avoidable to give unnatural feelings to the person who watches the outputted image of the image information.

According to the fifth image forming system, the image processing is carried out by the first image forming apparatus itself which requests other image forming apparatuses in a distributed manner. Therefore, as to the image information to be processed inside the first image forming apparatus, it is not necessary to transmit and receive to and from other image forming apparatuses. This causes (1) to shorten the time required for the processing, i.e., to save the time required for communications therebetween and (2) to simplify the communication operations.

According to the fifth image forming system, it is necessary to specify some of the second image forming apparatuses that are requested to carry out the foregoing distributed image processing, while it is not necessary to convert the processing capacity levels in the specified second image forming apparatuses.

The sixth image forming system in accordance with the present invention is characterized by being provided with:

a first image forming apparatus;

a plurality of second image forming apparatuses;

a communication apparatus that operatively connects the first image forming apparatus and the second image forming apparatuses so as to communicate image information with each other; and a memory apparatus that stores image processing information and image processing capacity information, the image processing information indicative of which types of image processing the first and second image forming apparatuses can carry out, the image processing capacity information indicative of processing capacity levels of the image processing, wherein the first image forming apparatus includes:

an image output section that provides a visualized image in accordance with the image information;

a first image processing section that carries out image processing with respect to the image information;

an input section through which instructions with regard to the image processing are inputted; and a first control section that (1) selects, in accordance with the image processing information and the image processing capacity information, some of the first and second image forming apparatuses that can carry out an image processing that has been instructed by the input section with processing capacity levels falling within a permissible range, (2) divides the image information for the selected some image forming apparatuses, (3) transmits one part of the divided image information to the first image processing section and transmits the remainder of the divided image information to the second image forming apparatuses through the cummunication apparatus when the first and second image forming apparatuses have been selected, while separately transmits each of the divided image information for the selected second image forming apparatuses to the selected second image forming apparatuses through the communication apparatus when only some of the second image forming apparatuses have been selected, and (4) sends to the image output section (a) image information that has been processed and returned by each of the selected second image forming apparatuses and (b) image information that has been processed by the first image processing section, and each of the second image forming apparatuses includes:

a second image processing section that carries out an image processing with respect to image information;

a second control section that (1) sends to the second image processing section the image information that has been inputted through the communication apparatus, and (2) returns through the communication apparatus to the first image forming apparatus the image information that has been processed by the second image processing section.

With the arrangement, when instructions relating to image processing is inputted to the input section, the first control section of the first image forming apparatus selects, in accordance with the image processing information and the image processing capacity information that has been stored in the memory apparatus, some of the first and second image forming apparatuses that can carry out the image processing that has been instructed by the input section with processing capacity levels falling within a permissible range of a processing level. Note that the respective operations, when only some of the second image forming apparatuses have been selected, of the first control section of the first image forming apparatus and of the second image forming apparatuses are coincident with those of the second image forming system. Note also that the respective operations, when the first and second image forming apparatuses have been selected, of the first control section of the first image forming apparatus and of the second image forming apparatuses are coincident with those of the third image forming system.

As mentioned above, according to the sixth image forming system, since a predetermined image processing is carried out in parallel by a plurality of image forming apparatuses, such an image processing can be quickly carried out.

Further, the foregoing image processing is carried out within processing capacity levels of the respective image forming apparatuses (i.e., within substantially the same processing capacity level), the processing capacity levels falling within a permissible range. Accordingly, when outputting the image information that has been processed to a display apparatus or to a sheet of paper through a recording apparatus such as a printer, it is possible to obtain images having substantially the same processing capacity level. Therefore, it is avoidable to give unnatural feelings to the person who watches the outputted image of the image information.

According to the sixth image forming system, it is necessary to select some of the second image forming apparatuses that are requested to carry out the foregoing distributed image processing, while it is not necessary to convert the processing capacity levels in the specified second image forming apparatuses.

In the foregoing fourth to sixth image forming system the first control section of the first image forming apparatus may be arranged so as to specify the processing capacity level that falls within the permissible range in accordance with an output capacity level of the image output section of the first image forming apparatus.

With the arrangement, it is possible (1) to handle the image information of the image output section, that visualizes the image information that has been image-processed, of the first image forming apparatus and (2) to obtain a good visualized image.

More specifically, when the processing capacity level of the control information is specified in accordance with an output capacity level of the image output section of the first image forming apparatus, the image information that has been image-processed corresponds to the image processing section of the first image forming apparatus, i.e., corresponds to an output of the image processing section. Accordingly, it is possible (1) for the image processing section to output the image information as it is and (2) for the image output section to output a good image.

Further, it is avoided that some image processings are carried out for a long time with a high processing level that exceeds the output capacity of an image forming apparatus that has requested other image forming apparatuses to carry out them them in a distributed manner. Therefore, it is avoidable that the image processings with such a high processing level become wasteful.

The foregoing second to sixth image forming system may be arranged so as to be further provided with image information input means, operatively connected to the first image forming apparatus, for inputting image information, wherein the first control section of the first image forming apparatus further adds final transmission address information to image information that is transmitted from the first image forming apparatus to the second image forming apparatus, the final transmission address information indicative of an image forming apparatus to which image information that has been processed should be finally transmitted, and each of the second image forming apparatus further transmits to another one of the second image forming apparatuses the image information inputted through the communication apparatus when each of the second image forming apparatuses can not carry out the image processing.

With the arrangement, when carrying out the image processing in a distributed manner with respect to the image information that has been inputted from the image information input means to the first image forming apparatus, image data are transmitted to at least one second image forming apparatuses. At this time, when the second image forming apparatus (the first apparatus that has been requested to carry out the distributed processing) is in unoperable condition such as in a trouble condition, i.e., when the second image forming apparatus can not carry out the image processing, the unoperable second image forming apparatus requests to another one of the second image forming apparatuses the foregoing distributed image processing. For example, when the foregoing another image forming apparatus (the second apparatus that has been requested to carry out the distributed processing) carries out the foregoing distributed image processing, the image information that has been processed is returned, in accordance with the final transmission address information, to the first image forming apparatus from the foregoing another one (the second apparatus that has been requested to carry out the distributed processing) without transmitting the image information from the the second image forming apparatus (the first apparatus that has been requested to carry out the distributed processing) to the first image forming apparatus.

As mentioned above, according to the present image forming apparatus, in the case where the nth second image forming apparatus (n≧2) carries out the image processing, the image data that has been processed can be simply and quickly transmitted to an image forming apparatus to which the image data that has been processed should be finally transmitted.

Further, it is ensured that the image data that has been processed is returned to the first image forming apparatus that has been requested to carry out the foregoing processing by the operator and the returned image data is recorded in the first image forming apparatus. Accordingly, the operator can easily retrieve the outputted image.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinbelow and the accompanying drawings which are given by way of illustration only, and thus, are not limitative of the present invention.

BRIEF DESCRIPTION OF THE DRAWINGS

FIG. 6(a) is a front view showing a basic screen on a liquid crystal display of the operation panel shown in FIG. 5; FIG. 6(b) is a front view showing a first function setting screen on the liquid crystal display thereof; and FIG. 6(c) is a front view showing a second function setting screen on the liquid crystal display thereof.

FIG. 7(a) is a front view showing a picture quality setting screen on the liquid crystal display of the operation panel shown in FIG. 5; and FIG. 7(b) is a front view showing a post-process setting screen on the liquid crystal display thereof.

FIG. 8(a) is a front view showing an initial setting screen on the liquid crystal display of the operation panel shown in FIG. 5; FIG. 8(b) is a front view showing a fingerprint registering screen on the liquid crystal display thereof; and FIG. 8(c) is a front view showing a section management setting screen on the liquid crystal display thereof.

FIG. 9(a) is a front view showing a limiter setting screen on the liquid crystal display of the operation panel shown in FIG. 5; and FIG. 9(b) is a front view showing a simulation screen on the liquid crystal display thereof.

DESCRIPTION OF THE EMBODIMENTS

First Embodiment

The following description deals with one embodiment of the present invention with reference to FIGS. 1 through 16.

Figure 2:
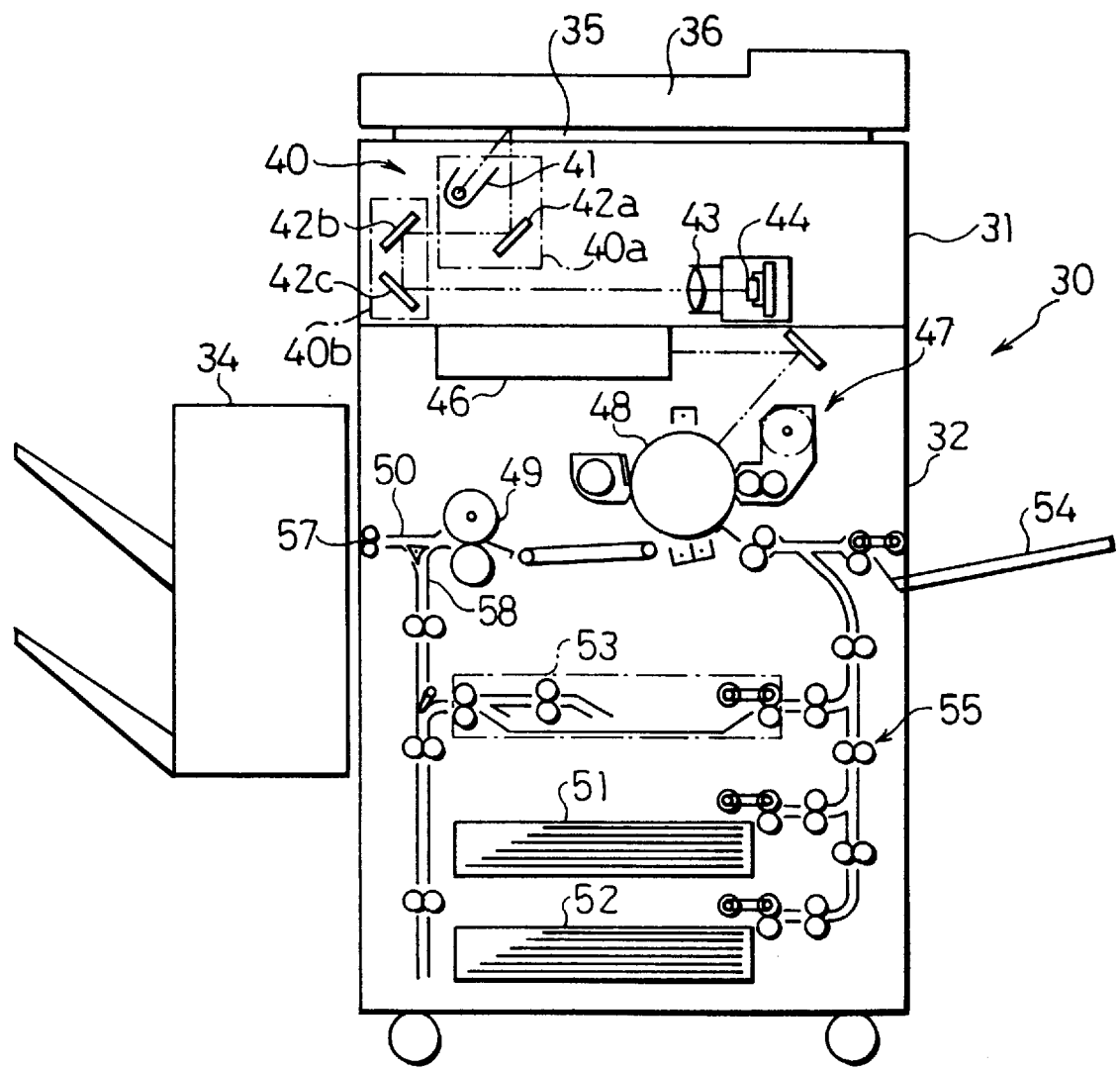
FIG. 2 is a longitudinal sectional view of a digital copying machine that is provided in the image forming system which carries out the operations shown in FIG. 1.

The present image forming system is arranged such that a plurality of digital copying machines are operatively connected through a communication apparatus. Each digital copying machine functions as an image forming apparatus. FIG. 2 is a cross-sectional view showing the entire structure of a digital copying machine 30 which is one example of the foregoing digital copying machine. In FIG. 2, the digital copying machine 30 is provided with a scanner section 31, a laser printer section 32 that functions as an image recording section, and a post-processing device 34 including a sorter.

The scanner section 31 is provided with a document platen 35 made of transparent glass, a recirculating automatic document feeder 36 (hereinafter, referred to as RADF) that automatically supplying and feeding documents onto the document platen 35 and a scanner unit 40 that scans and reads an image of a document that has placed on the document platen 35. The document image that has been scanned and read by the scanner unit 40 is sent as image data to an image processing section (later described) in which a predetermined image processing is carried out.

The RADF 36 automatically (1) feeds a plurality of documents, that have been set on a predetermined document tray all together, one by one onto the document platen 35 of the scanner unit 40 and (2) retrieves the same. The RADF 36 is provided with a transport path for one-sided documents, a transport path for double-sided documents, a transport path switching mechanism and other mechanisms so that one side or double sides of a document can be scanned by the scanner unit 40 in accordance with selection made by the user.

The scanner unit 40 is provided with a first scanning a unit 40a, a second scanning unit 40b, an optical lens 43, and a CCD (Charge Coupled Device) 44. The first scanning unit 40a is provided with a lamp reflector assembly 41 and a first reflection mirror 42a that project light onto a surface of the ducument on the document platen 35 so as to scan the projected surface of the document.

The second scanning unit 40b is provided with a second reflection mirror 42b and a third reflection mirror 42c. The first through third reflection mirrors 42a through 42c direct light reflected from the document to the CCD 44. The optical lens 43 converges an image of the reflected light onto the CCD 44. The CCD 44 converts the image of the reflected light of the document into a electric image signal.

The scanner section 31 is arranged so as to move the scanner unit 40 along the lower surface of the document platen 35 and scan the document image to convert into image data while placing the documents one by one on the document platen 35 in accordance with the joint working of the RADF 36 and the scanner unit 40.

The image data, thus obtained from the scanner section 31, is sent to an image processing section (described later), and after it has been subjected to various processes, the resulting data is temporarily stored in a memory 73 of the image processing section. Thereafter, the image data is supplied to the laser printer section 32 in accordance with an instruction for output, and recorded onto a sheet of paper as an image.

There are provided, in a upper part of the laser printer section 32, with a laser writing unit 46 and an electrophotographic process section 47 that forms images, while in a lower part of the laser printer section 32 with a sheet containing and feeding section 55. The laser writing unit 46 has a semiconductor laser that releases a laser light beam in response to the image data from the memory 73, a polygon mirror that deflects the laser light beam with a constant angular velocity, an f-θ lens that corrects the laser light beam that has been subjected to the deflection with a constant velocity deflection on a photoconductor drum 48 in the electrophotographic process section 47, and other parts.

In the same manner as the conventional arrangements, the electrophotographic process section 47 is provided with the photoconductor drum 48 and devices such as a charger, a developing device, a transfer device, a separating device, a cleaning device, and a fixing device 49, all of which are provided around the photoconductor drum 48. A transport path 50 is provided on the downstream side of the fixing device 49 in a transporting direction of a sheet of paper on which an image has been formed. The transport path 50 is separated into a transport path 57 that connects to the post-processing device 34 and a transport path 58 that connects to the sheet containing and feeding section 55.

The sheet containing and feeding section 55 is provided with a first cassette 51, a second cassette 52, a double-side copying unit 53, and a manual tray 54. A bundle of sheets of paper are contained in the first and second cassettes 51 and 52, respectively. When the operator selects a cassette containing sheets of paper having a size the operator desires, the sheets of paper are fed out one by one from the upper most sheet of the bundle into the electrophotographic process section 47. The double-side copying unit 53 turns inside out the sheet on which an image has been formed by the electrophotographic process section 47, and then feeds to the electrophotographic process section 47. Note that the double-side copying unit 53 feeds the sheet, on which an image has been formed by the electrophotographic process section 47, to the electrophotographic process section 47 without such a turning inside out.

In the laser printer section 32, the image data, which has been read from the memory 73, is released as a laser light beam from the laser writing unit 46, and formed as an electrostatic latent image on the surface of the photoconductor dram 48 in the electrophotographic process section 47. The electrostatic latent image is visualized as a toner image, and the toner image is electrostatically transferred onto a sheet of paper that has been transported from the sheet containing and feeding section 55, and then is fixed on the sheet of paper by the fixing device 49.

Figure 3:
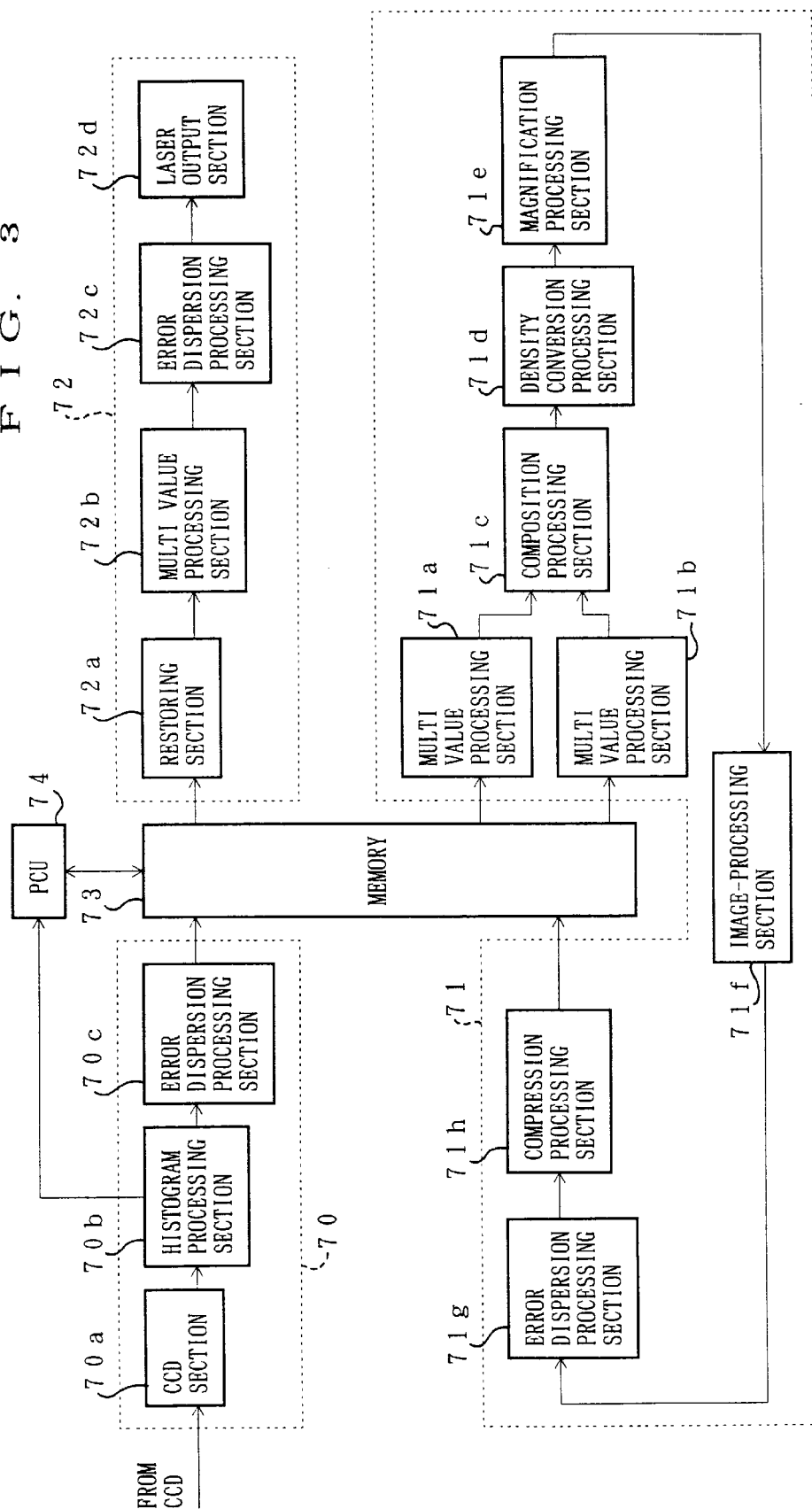
FIG. 3 is a block diagram showing a structure of an image processing section that is provided in the digital copying machine shown in FIG. 2.

The sheet of paper on which the image has been formed in this manner is sent from the fixing device 49 to the post-processing device 34 through the transport path 50, or again to the electrophotographic process section 47 through the transport paths 50, 58 and the double-side copying unit 53. The following description deals with the image processing section that is provided in the digital copying machine 30. The image processing section carries out image processing on the image data of the document that has been obtained from the scanner section 31. As illustrated in FIG. 3, the image processing section is provided with an image data input section 70, an image data processing section 71, an image data output section 72, a memory 73, and a print control unit 74 (hereinafter, referred to as PCU) that functions as a control section.

The PCU 74, which controls the entire operations of the digital copying machine 30, is provided with a CPU (Central Processing Unit). The memory 73, which stores image data, is constituted by a RAM (Random Access Memory), a hard disk, and other parts.

The image data input section 70 has a CCD section 70a, a histogram processing section 70b, and an error dispersion processing section 70c. The image data input section 70 converts image data of a document that has been read by the CCD 42 into binary coded data, and processes the image data by using the error dispersion method while representing the data as binary digital quantity in the histogram, thereby temporarily storing the resulting data in the memory 73.

In the CCD section 70a, analog signals, which correspond to pixel densities of the image data, are analog-to-digital converted, and then subjected to an MTF correction and a black-and-white correction, or a gamma correction, and the resulting signals are released to the histogram processing section 70b as digital signals with 256 gray scales (8 bits).

In the histogram processing section 70b, the digital signals released from the CCD section 70a are added individually for the respective pixel densities of 256 gray scales; thus, density information (histogram data) is obtained. The histogram data is sent to the error dispersion processing section 70c as pixel data, and also sent to the PCU 74, if necessary.

In the error dispersion processing section 70c, the digital signals of 8 bits/pixel, released from the CCD section 70a, are converted into one bit (binary coded) by the error dispersion method which is one type of pseudo intermediate processing, that is, by the method for reflecting the error of binary coded digits to the binary coding decision between the adjacent pixels; thus, re-distributing operations for exactly reproducing the densities of local regions of a document are carried out.

The image data processing section 71 is provided with a multi-value processing sections 71a and 71b, a synthesis processing section 70c, a density conversion processing section 71d, a magnification processing section 71e, an image processing section 71f, an error dispersion processing section 71g and a compression processing section 71h. The image data processing section 71 serves as a processing section that converts the inputted image data into image data that is desired by the user. Additionally, the above-mentioned processing sections, contained in the image data processing section 71, are used on demand, and are not necessarily used.

In the multi-value processing sections 71a and 71b, the image data that has been binary coded in the error dispersion processing section 70c is again converted into data with 256 gray scales. In the synthesis processing section 71c, logical operations, that is, OR, AND or exclusive-OR operation, are selectively carried out for each pixel. The data used in this operation is pixel data stored in the memory 73 and bit data from a pattern generator (PG).

In the density conversion processing section 71d, the relationship of the output density to the input density is properly set with respect to the data with 256 gray scales based upon a predetermined gray-scale conversion table. In the magnification processing section 71e, pixel data (density value) on a target pixel that is to be obtained after a specified change in magnification is found by carrying out an interpolating process based on the inputted known data in accordance with a specified magnification. Thereafter, in accordance with the pixel data, the change in magnification is carried out in the sub-scanning direction, and then is carried out in the scanning direction.

In the image processing section 71f, various image processes are carried out on the inputted pixel data. Further, information extraction with respect to data rows, such as feature extraction, is carried out. In the error dispersion processing section 71g, the same process as that carried out in the synthesis processing section 70c in the image data input section 70 is carried out. In the compression processing section 71h, the binary data is compressed by a coding process that is referred to as "run length". Here, with respect to the compression of image data, the compression is operated in the last processing loop at the time when the final output image data has been complete.

The image data output section 72 is provided with a restoring section 72a, a multi-value processing section 72b, an error dispersion processing section 72c, and a laser output section 72d. The image data output section 72 restores the image data that has been stored in the memory 73 in a compressed state so as to again convert it to the original data with 256 gray scales, carries out an error dispersion process for quaternary data that provides smoother intermediate gray-scale expressions than binary data, and then transmits the resulting data to the laser output section 72d.

In the restoring section 72a, the image data that has been compressed by the compression processing section 71h is restored. The multi-value processing section 72b carries out the same process as that carried out in the multi-value processing sections 71a and 71b in the image data processing section 71. The error dispersion processing section 72c carries out the same process as that carried out in the error dispersion processing section 70c in the image data input section 70.

In the laser output section 72d, the digital pixel data is converted to a laser on/off signal in accordance with a control signal from a sequence controller which is not shown. The semiconductor laser in the laser writing unit 46 is turned ON/OFF in response to the on/off signal, thereby allowing an electrostatic latent image to be written on the photoconductor drum 48.

Note that data, which is dealt in the image data input section 70 and the image data output section 72, is basically stored in the memory 73 in the form of binary data so as to save the capacity of the memory 73; however, the data may be processed in the form of quaternary data in order to prevent the degradation of image data.

Figure 4:
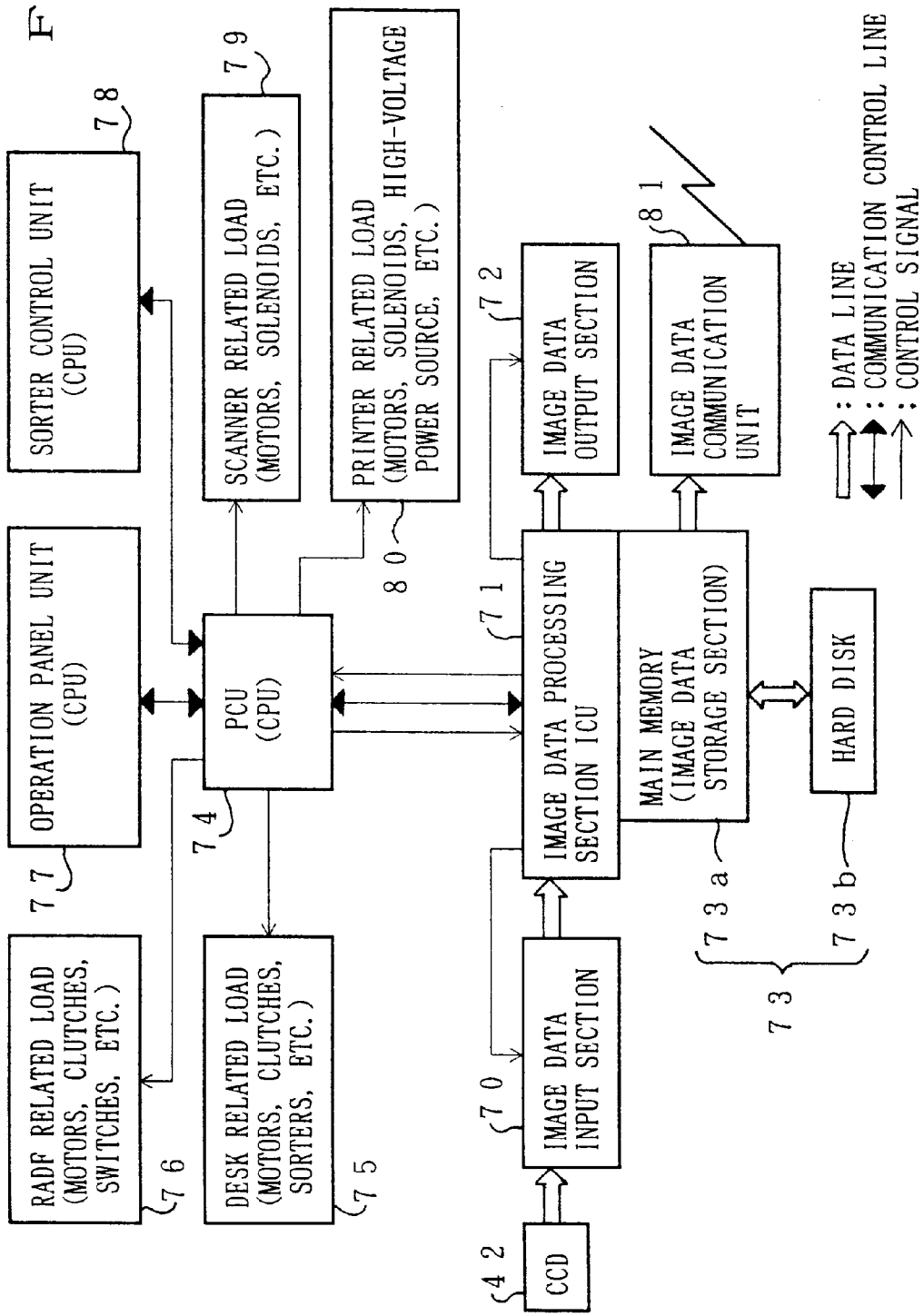
FIG. 4 is a block diagram showing a structure of a control system that is provided in the digital copying machine shown in FIG. 2.

The operation of the digital copying machine 30 is controlled by the PCU 74, and FIG. 4 shows the arrangement of the control system effected by the PCU 74.

In FIG. 4, the following parts and sections are operatively connected to the PCU: a desk-related load 75, an RADF-related load 76, an operation panel unit 77, a sorter control unit 78, a scanner-related load 79, a printer-related load 80, and the aforementioned image data processing section 71.

Ad The PCU 74 supervises the above-mentioned parts by sequential control, and releases control signals to the respective parts upon controlling them. The desk-related load 75 is a load related to motors, clutches, and other parts in the multi-stage paper feed unit 33 and the sorter of the post-processing device 34 except for the digital copying machine main body. The RADF-related load 76 is a load related to motors, clutches, switches and other parts in the RADF 36. The scanner-related load 79 is a load related to motors, solenoids, and other parts in the scanner unit 40. The printer-related load 80 is a load related to motors, solenoids, a high voltage power source and other parts in the electro-photographic process section 47.

The sorter control unit 78, which is provided with a CPU, controls the operation of the sorter in accordance with the control signal from the PCU 74.

The operation panel unit 77, which has a CPU, is an input section for various settings such as copying modes, instructions, etc. that are inputted by the user to the digital copying machine 30. The operation panel unit 77 transfers a control signal, for example, corresponding to a copying mode that has been set by the user through an input operation, to the PCU 74. The PCU 74 operates the digital copying machine 30 in accordance with the corresponding mode in response to the control signal. The PCU 74 also transfers to the operation panel unit 77 a control signal that indicates the operation state of the digital copying machine 30. In order to inform the user of the current operation state of the digital copying machine 30, the operation panel unit 77 displays the current state on its display section in accordance with the control signal.

Moreover, the memory 73, connected to the image data processing section 71, is constituted by a main memory 73a and a hard disk 73b which are made of, for example, semiconductor memories. An image data communication unit 81 is connected to the main memory 73a. The image data communication unit 81 is provided so as to make possible information communications with other digital information apparatuses through image data, image control signals, etc. For example, in a digital copying machine 94 shown in FIG. 11, the image data communication unit 81 corresponds to an interface 94a and a telecommunication line 97.

Figure 5:
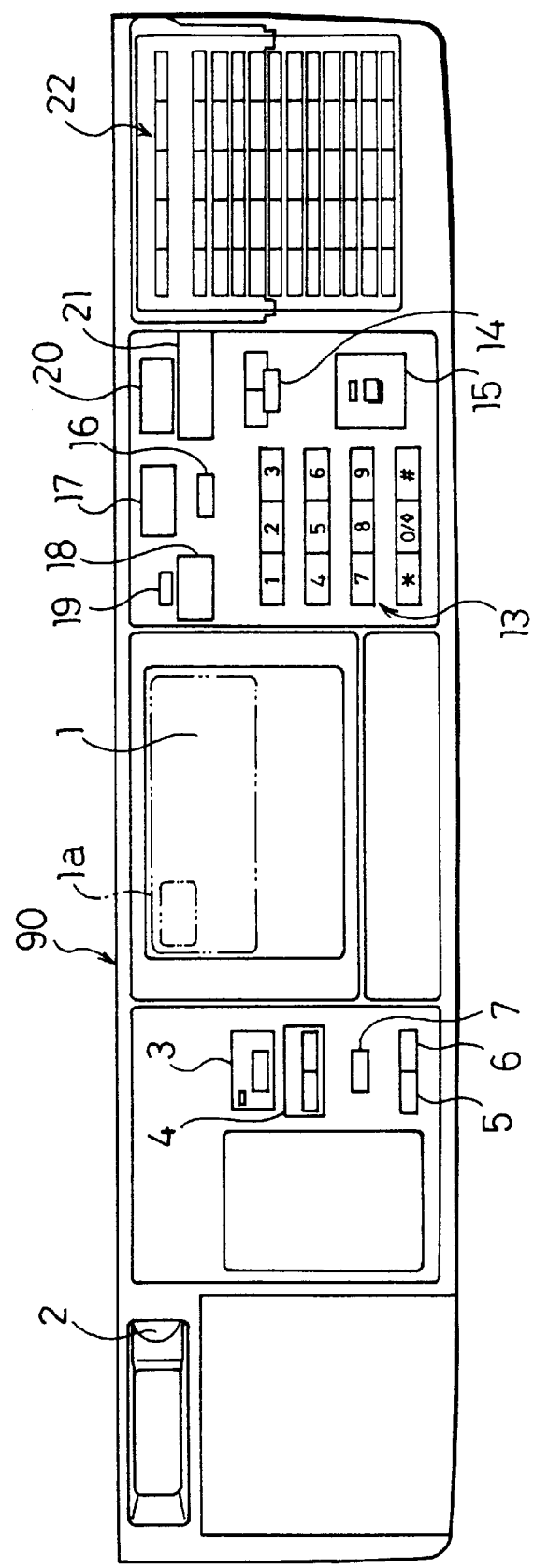
FIG. 5 is a front view of an operation panel that is provided in the digital copying machine shown in FIG. 2.

The operation panel unit 77 is provided with an operation panel 90 which functions as an input section, as shown in FIG. 5. On the operation panel 90, a liquid crystal display 1, which is a display section of a touch panel system, is placed in the center thereof. A screen switching instruction area 1a is provided on one part of the screen of the liquid crystal display 1. The screen switching instruction area 1a is used for inputting an instruction for switching the display screen of the liquid crystal display 1 to a screen for selecting image editing functions. When the user directly presses this area 1a with his or her finger, various editing functions are displayed in a list on the screen of the liquid crystal display 1 so as to make it possible to select desired functions, as will be described later. In this case, when the user presses an area of a desired editing functions, the specified editing function is set.

Further, on the operation panel 90, a brightness adjusting dial 2, which adjusts the brightness of the screen of the liquid crystal display 1, is provided on its left end position as shown in FIG. 5. There are provided a magnification automatic setting key 3, a zoom key 4, fixed keys 5, and an equal magnification key 7 between the dial 2 and the liquid crystal display 1. The magnification automatic setting key 3 is used for setting the mode for automatically selecting the copy magnification, and the zoom key 4 is used for setting the copy magnification at a rate of 1 (one) percentage point. The fixed magnification keys 5 and 6 are used for selecting a fixed magnification, and the equal magnification key 7 is used for returning the copy magnification to the reference magnification (equal magnification).

There are provided on the right hand side of the liquid crystal display 1 in FIG. 5, a number setting key 13, a clear key 14, a start key 15, an all cancellation key 16, an interruption key 17, an operation guide key 18, a message forwarding key 19, a memory transmission mode key 20, a copy/facsimile mode switching key 21, and one-touch dial key 22.

The number setting key 13 is used for setting the number of copies, and the clear key 14 is operated when the number of sheets is cleared, or when a continuous copying operation is stopped in the middle of the operation. The start key 15 is used for instructing the start of a copy process, and the all cancellation key 16 is used for cancelling all the presently set modes so as to return the machine to the reference state. The interruption key 17 is operated when upon a continuous copying process, another document is to be copied.

The operation guide key 18 is operated when the user does not know how to use the digital copying machine 30, and upon pressing the key, the liquid crystal display 1 displays how to operate the digital copying machine 30. The message forwarding key 19 is used for switching the display of messages that have been displayed by the operation of the operation guide key 18 in a successive forwarding manner.

The memory transmission mode key 20 and the copy/facsimile mode switching key 21 are setting keys related to facsimile modes. The memory transmission mode key 20 is used for instructing that the transmit document be transmitted after having been temporarily stored in the memory, and the copy/facsimile mode switching key 21 is used for switching modes of the digital copying machine 30 between the copy and facsimile. The one-touch dial key 22 is used for dialing the phone to a receiver whose telephone number has been preliminarily stored in the digital copying machine 30 by a one-touch operation.

Note that the foregoing arrangement of the operation panel 90 related to various types, layout, etc. of keys is merely given as one example, and it may be modified depending on various functions to be installed in the digital copying machine 30.

The liquid crystal display 1 is, for example, allowed to give the following displays on the screen: a basic screen as shown in FIG. 6(a), the first function setting screen shown in FIG. 6(b), the second function setting screen shown in FIG. 6(c), an image quality setting screen shown in FIG. 7(a), a post-process setting screen as shown in FIG. 7(b), an initial setting screen shown in FIG. 8(a), a fingerprint registration screen shown in FIG. 8(b), a department management setting screen shown in FIG. 8(c), a limiter setting screen shown in FIG. 9(a), a simulation screen shown in FIG. 9(b), and other screens which will be described later. The basic screen is provided with a function setting region, an image quality setting region, a post-process setting region, an initial setting region, an operation region for set-function confirmation and a cassette setting region. These regions correspond to setting keys 110a through 101f. Moreover, the basic screen includes a set-cassette display, a density display, a copy number display, and a magnification display. When the above-mentioned operation region for set-function confirmation is operated, functions that have been set in the present image forming system are displayed on the liquid crystal display 1.

The first function setting screen is provided with regions for setting various editing functions, such as mirror image, slanted character, inversion, shading, trimming, and masking. These regions correspond to setting keys 102a through 102f. Moreover, operation regions are set so as to provide transitions to the basic screen and the next page. When a next page key is pressed, the screen is changed into the second function setting screen.

The second function setting screen is provided with regions for setting editing functions such as synthesis and an independent change in magnification, a region for setting sharpness functions, and translation functions. These regions correspond to setting keys 103a through 103d. Moreover, operation regions are set so as to provide transitions to the basic screen and the previous screen.

The foregoing sharpness functions indicate the following processings. More specifically, according to the sharpness processings, edge portions of an image may be emphasized or alternatively softened so as to soften the entire image. The way to carry out the sharpness processings differs from apparatus to apparatus, i.e., there are many ways to carry out the sharpness processings. For example, examined Japanese patent publication No. 80192/1993 (Tokukouhei 5-80192) discloses edge processings for image processing apparatuses, i.e., discloses how to emphasize edge portions of an image. According to the edge processings, it is judged whether or not an object pixel is an edge image. If it is judged that the object pixel is an edge image, (1) the density level of the object pixel is converted into binary coded, i.e., either all white or all black and dither processings are carried out with respect to other image regions, thereby emphasizing the edge portion of the image.

The image quality setting screen includes setting regions for setting the density, HI-FI (high image quality copying mode), background elimination mode, automatic magnification change mode, character mode, character-photograph mixed mode, photograph mode, and magnification. Further, displays are provided for density and magnification.

The post-process setting screen is provided with an input region for determining whether a document in question is one-sided or double-sided, an input region for determining whether copying in question is made on one side or on double sides, and a setting region for binding functions. Moreover, setting regions for post-process functions, such as staple sorter, sorter and finish, and a setting region for electronic RDH are provided.

The initial setting screen is provided with setting regions for various modes, such as fingerprint registration, department management, simulation, maintenance management, new function registration, and output device selection, as well as an operation region for making a transition to the basic screen.

On the fingerprint registration screen, input regions for a department code and a name are provided, and the inputted department code and name are displayed.

On the department management screen, setting input region for a department code and manpower thereof, and the inputted department code and manpower thereof are displayed.

Figure 10:
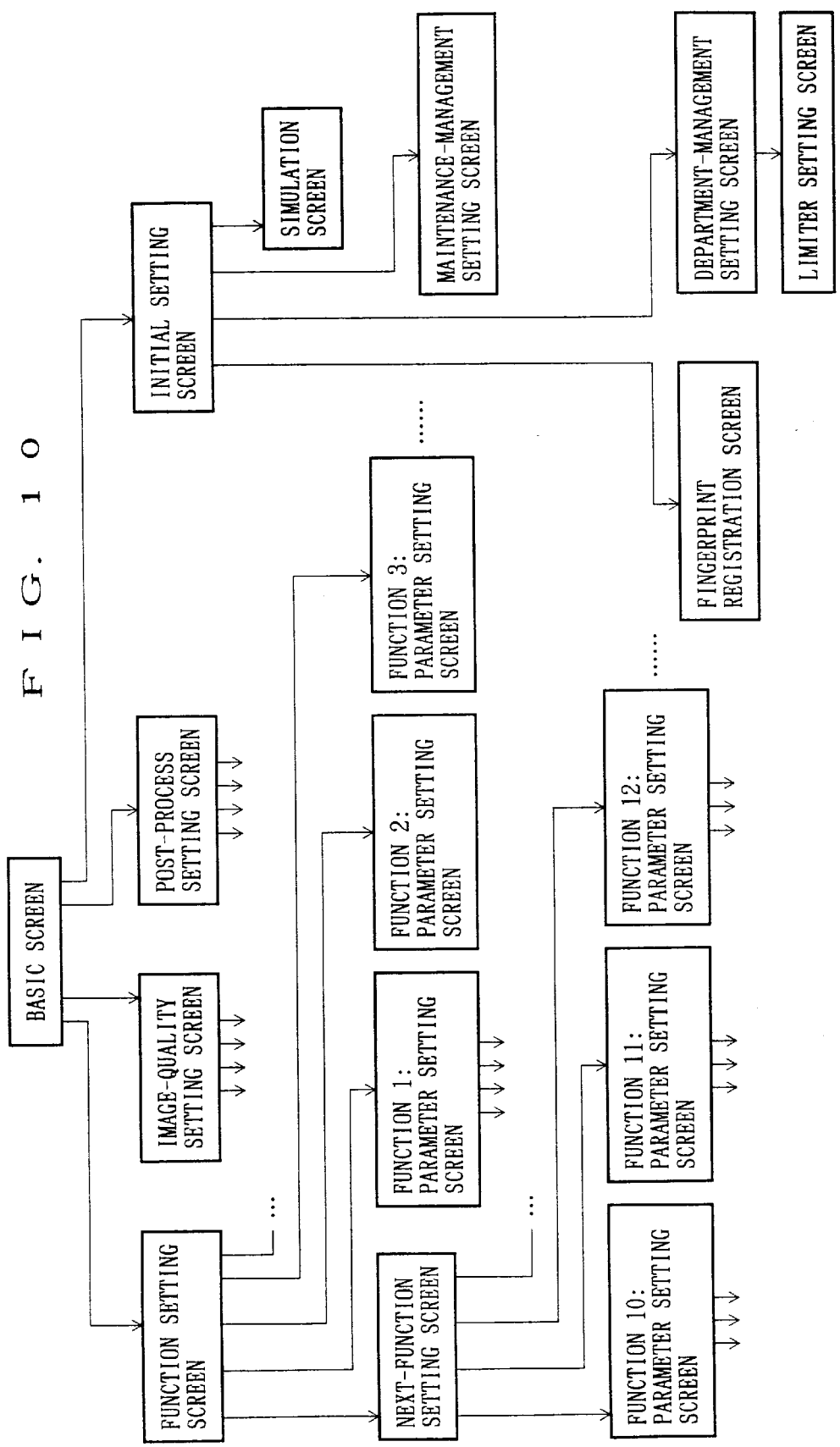
FIG. 10 is an explanatory view showing processes in which the respective screens transfer to other screens on the liquid crystal display of the operation panel shown in FIG. 5.

Transitions to the respective screens are carried out in accordance with the sequence shown in FIG. 10. Namely, in the liquid crystal display 1, the basic screen is first displayed, and on this display screen, when any of the function setting region, image quality setting region, post-process setting region and initial setting region is pressed, the display screen is allowed to transfer to the screen corresponding to the specified region.

Figure 12A:
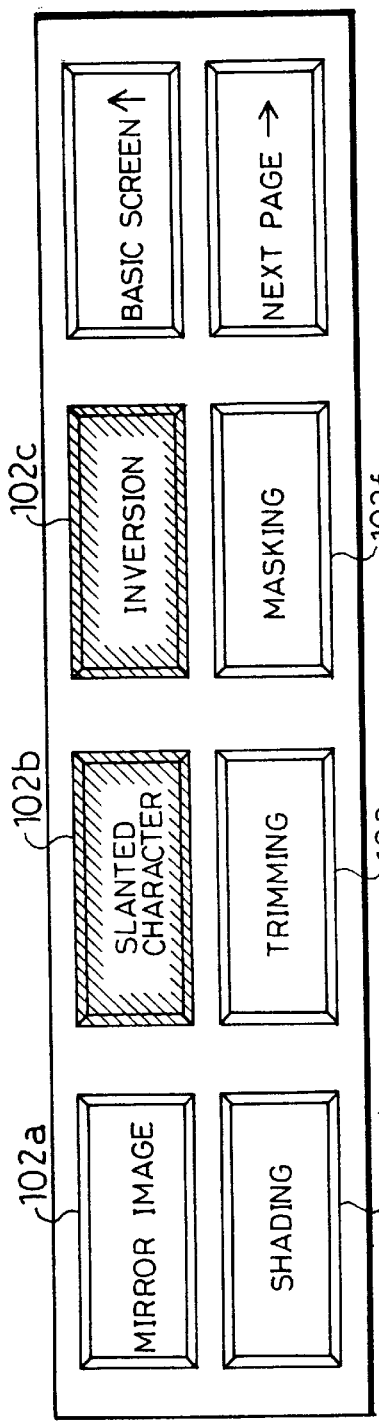
FIG. 12(a) is a front view showing a selected state of image editing functions of the first function setting screen on the liquid crystal display of the operation panel shown in FIG. 5 shown in FIG. 6(b)
Figure 12B:
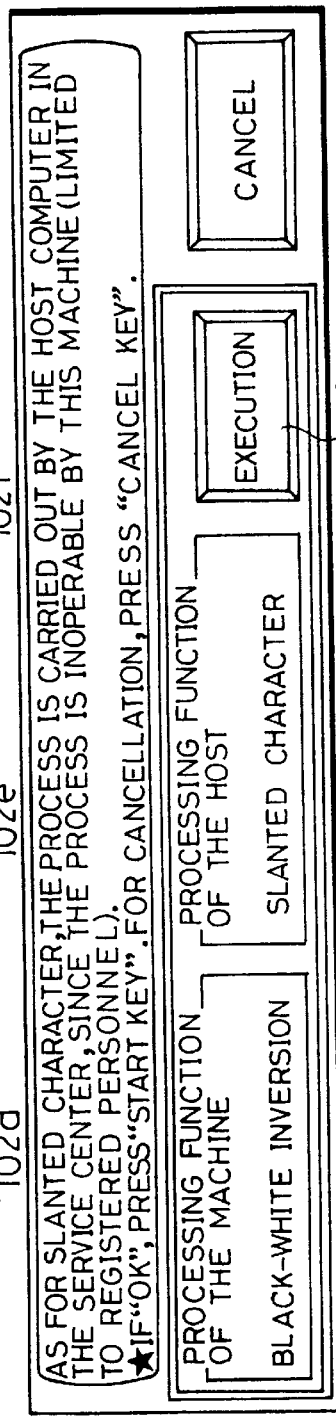
FIG. 12(b) is a front view showing a display state on the liquid crystal display that corresponds to an operation of slanted character in the liquid crystal display.
Figure 12C:
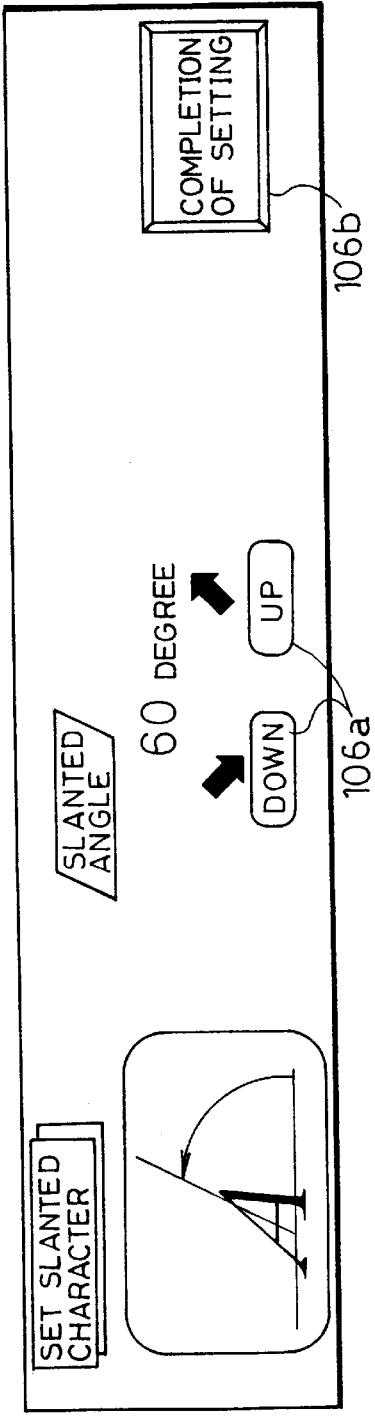
FIG. 12(c) is a front view showing an inclined font setting screen of the liquid crystal display on the operation panel.
Figure 13:
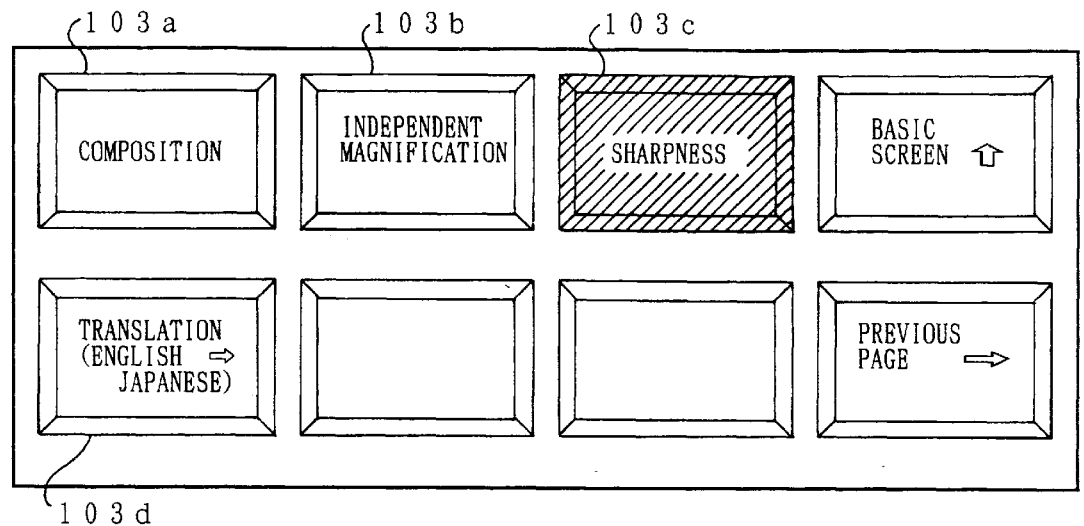
FIG. 13(a) is a front view showing a selected state of image editing functions of the second function setting screen (see FIG. 6(c)) on the liquid crystal display of the operation panel shown in FIG. 5.
FIG. 13(b) is a front view showing a display state, on the liquid crystal display, that corresponds to an operation at S3 shown in FIG. 1.
FIG. 13(c) is a front view showing a sharpness setting screen of the liquid crystal display on the operation panel.
Figure 13:
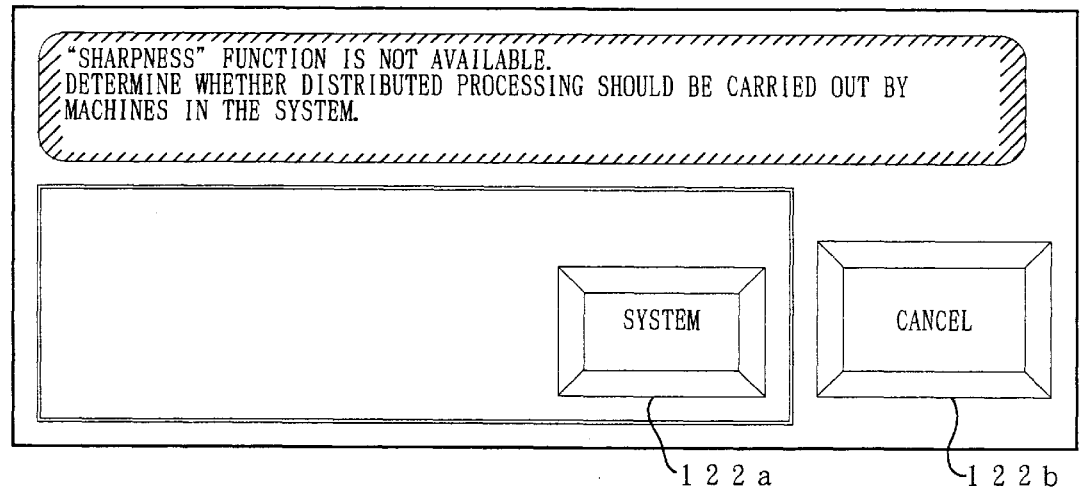
Figure 13:
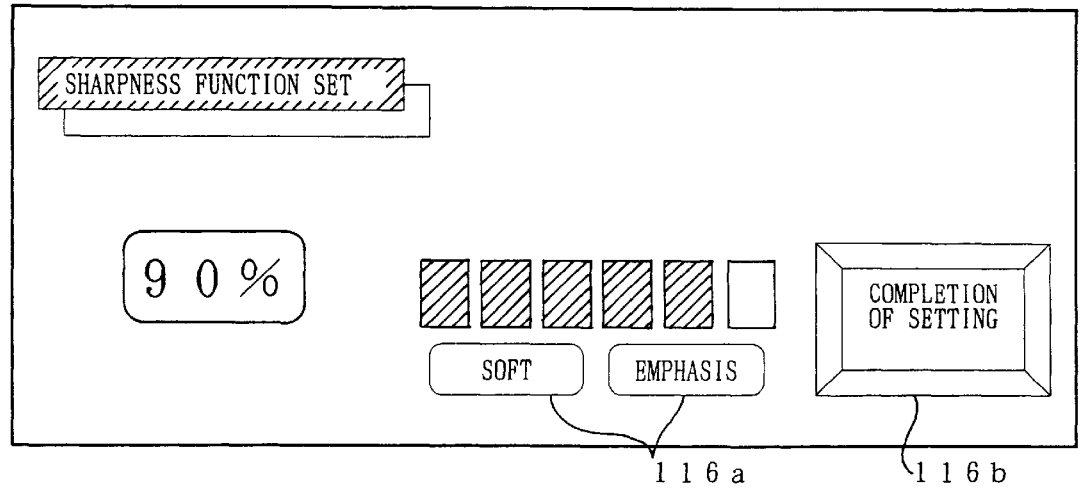

More specifically, for example, if the function setting region is pressed, the screen is switched to the first function setting screen, and if the operation region for making a transition to the next page is pressed on this screen, the screen is switched to the second function setting screen (NEXT-function setting screen). Here, if the operation region for making a transition to the basic screen, the screen is switched to the basic screen. Moreover, for example, in the first function setting screen, when slanted character function setting region and inversion function setting region are pressed, the slanted character function setting region and inversion function setting region are inverted as shown in FIG. 12(a), and thereafter, the screen is switched to the screen shown in FIG. 12(b). Then, when an execution key 112a is pressed, the screen is switched to the slanted character setting screen as shown in FIG. 12(c). The slanted character setting screen is provided with an angle input key 106a that is a setting region for a slanted angle and a setting completion key 106b that is an input region for setting completion. Further, the resulting slanted angle is displayed.

Note that in the first and second function setting screens when a desired function setting region is pressed, the screen of the liquid crystal display 1 is switched to a corresponding parameter setting screen such as the above-mentioned slanted character setting screen.

Here, Table 1 shows examples of image editing functions that are provided in the present image forming system and that can be set by the operations of the above-mentioned function setting regions. However, the image editing functions that are set in the present image forming system are not intended to be limited thereby. For example, other functions, such as a function for making a fair copy of hand-written characters and images, may be provided.

TABLE 1

| IMAGE EDITING FUNCTIONS | OUTLINE OF PROCESSING |
| --- | --- |
| Independent change in magnification | Set different magnifications with respect to the longitudinal and lateral directions of a document image. |
| Sharpness | Adjusts the image quality of a copy. |
| Margin for binding | Makes a margin in a copy with a desired width. |
| Erasure of frame | Makes a copy with its frame erased. |
| Centering | Makes a copy virtually in the center of a sheet of copy paper. |
| 2 copies in one set | Copies a book. |
| Address copy | Outputs a copy image with an address synthesized therein. |
| Multi-shot | Combines and copies images of a plurality of pages to one sheet and copied. |
| Trimming | Copies only a specified portion. |
| Masking | Makes a copy with a specified portion erased. |
| Shifting function | Makes a copy with a document image shifted to a desired position. |
| Composite function | Composes and copies a plurality of document images. |
| Black-white inversion | Makes a copy with a negative/positive inversion. |
| Net process | Makes a copy with a net providing/erasing process. |
| Shading | Makes a copy with shades. |
| Framing | Makes a copy with its image framed. |
| Slanted image | Makes a copy with its image slanted. |
| Mirror image | Makes a copy with its image inverted like a mirror image. |
| Repeat copy | Copies a plurality of the same images on one sheet. |
| 2 in 1 copy | Copies a set of two documents on one sheet. |
| Dated copy | Makes a copy with the date written therein. |
| Center mark | Copies an image with a center mark added thereto. |
| Enlarged divisional output | Copies an enlarged document onto a plurality of sheets in a divided manner. |

TABLE 1-continued

| IMAGE EDITING FUNCTIONS | OUTLINE OF PROCESSING |
|---|---|
| Translation | Translates a document. |
| High image quality process | Makes a copy using a high image quality process. |

Figure 11:
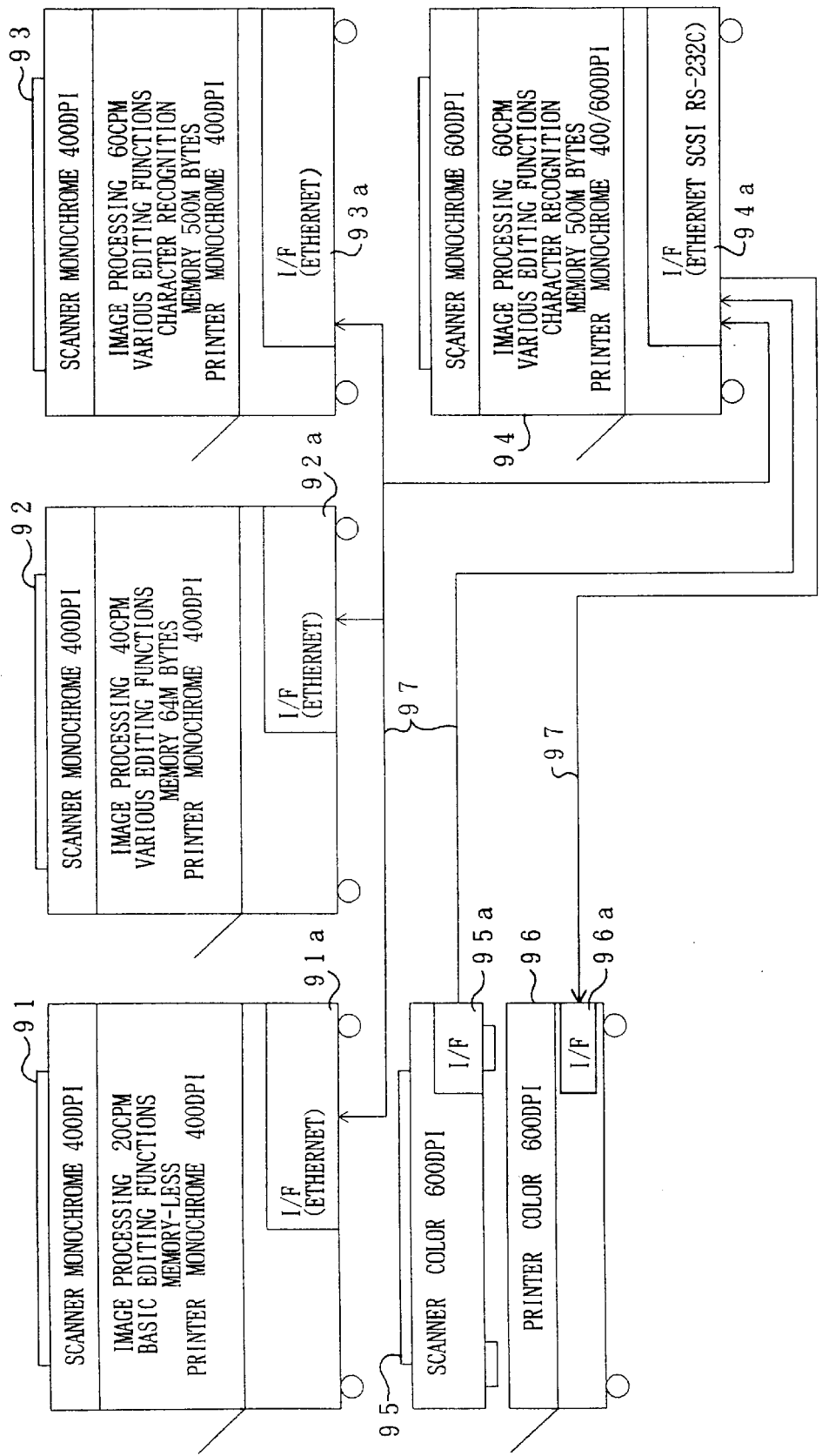
FIG. 11 is a schematic explanatory diagram showing a structure of an image forming system performing the operations of FIG. 1.

For example, as shown in FIG. 11, the present image forming system is provided with digital information apparatuses installed in an office. The image forming system of FIG. 11 is provided with digital copying machines 91 through 94 that are image forming apparatuses, a scanner 95, and a printer 96.

The digital copying machine 91 is a low function, inexpensive, memory-less one, and merely has basic editing functions. Here, the "memory-less" means that although a page memory capable of storing a lot of image data is not provided, at least a line memory required for carrying out normal jobs for image data in a digital copying machine is provided. The basic editing functions means those functions, such as black-white inversion, that can be carried out without the need for a page memory. In the digital copying machine 91, the scanner function, provided by the scanner unit 40 in FIG. 2, has a resolution of 400 DPI in the case of a monochrome process. The copy speed is set to 20 CPM (20 sheets/minute), which is typical for low speed models. Furthermore, in the digital copying machine 91, the printer function, provided by the laser printer section 32, is set to 400 DPI in the case of a monochrome process, and an interface (I/F) 91a is also installed.

The digital copying machine 92 has a scanner function of a resolution of 400 DPI in the case of a monochrome process, a printer function of 400 DPI in the case of a monochrome process, and a copy speed of 40 CPM, which are typical for middle class apparatuses. There are provided various editing functions, a memory of 64 bytes (a capacity corresponding to 4 pages in A4-size with 400 DPI, 8 bits/pixel) that functions as a page memory, and an interface 92a. The memory is referred to as the main memory 73a shown in FIG. 4.

The digital copying machine 93 has a scanner function of a resolution of 400 DPI in the case of a monochrome process, a printer function of 400 DPI in the case of a monochrome process, and a high copy speed of 60 CPM.

The digital copying machine 94 has a scanner function of a resolution of 600 DPI in the case of a monochrome process, a printer function of either 400 DPI or 600 DPI in the case of a monochrome process, and a high copy speed of 60 CPM.

Each of the digital copying machines 93 and 94 is provided with various editing functions, a character recognizing function, a coding function for bit data and a large capacity of 500 Mbytes (a capacity corresponding to 100 pages in A4-size with 400 DPI, 8 bits/pixel at a compression rate of ¼) that functions as a page memory, which are regarded as high class functions. Therefore, it is possible to carry out a process for changing the order of pages of image data and also to store document data in various formats. The above-mentioned memory corresponds to a memory including the main memory 73a and the hard disk 73b shown in FIG. 4. Further, the digital copying machines 93 and 94 are provided with an interfaces 93a and 94a, respectively.

The scanner 95, which can read color images, has a resolution of 600 DPI. The printer 96, which can print color images, has a recording density of 600 DPI. These scanner 95 and printer 96 have interfaces 95a and 96a, respectively.

The digital copying machine 94 is operatively connected to the digital copying machines 91 through 93, the scanner 95, and the printer 96, respectively through the telecommunication line 97, so that it is possible to carry out mutual transmitting and receiving of data. Accordingly, the interfaces 91a through 96a, the telecommunication line 97, and the PCU 74 constitute a communication apparatus.

The communication apparatus handles the following types of data: (1) bit data such as image data (gray scale data per pixel, for example, 8 bits; 256 gray scales) or (2) comand codes. The communication apparatus can direct high gradation image such as nature picture with high precision. The communication apparatus can direct at high speeds text data such as characters by reducing the amount of data based on the fact that the text data is subject to coding. Especially, image data having high gradation such as the nature picture may be transmitted after being processed with the use of the dither method or the error dispersion method. The dither method and the error dispersion method are generally one of area gradation method for the purpose of compressing the data amount. The processing with the use of the error dispersion method is carried out in advance in each apparatus. Each format of transmitting data is set in accordance with the format which each of the digital copying machines 91 through 94 or the printer 96 can proceed. For example, according to a digital copying machine which has received image data to be outputted to a sheet of paper, the image data is sent to the laser printer section 32 and is converted by an image processing section into a series of data that is necessary during recording, and thereafter outputted.

Each of the interfaces 91a through 96a is defined by a normalized protocol and a transmitting speed, and an appropriate standard is selected based on (1) the content of transmitting data such as data amount and (2) mutual position relations such as distances therebetween. Further, according to the present image forming system, not only an apparatus is operatively connected to another apparatus by one to one but also a plurality of apparatuses are operatively connected to each other through the common telecommunication line 97 like the daisy chain. Therefore, an address is assigned to each apparatus so that each of the interfaces 91a through 96a can recognize a destination to which the image data is transmitted. The standard of the interfaces 91a through 96a is, for example, Ethernet that is a network capable of transmitting image data at high speeds. The interfaces 91a through 96a are compatible with commonly used standards such as SCSI (Small Computer System Interface) and RS-232C.

The digital copying machines 91 through 94 have (1) a facsimile function capable of transmitting and receiving of data through a telephone line and (2) a printer mode capable of printing out document data from personal computers or word processors.

Note that the function of a digital copying machine provided in each office differs based on factors such as its price and the capacity of its image memory. Various type of digital copying machines are presented in accodance with the usage purpose of each office and the degree of request for each function. Accordingly, a digital copying machine provided in each office is not limited to the foregoing digital copying machines 91 through 94. It is likely that various types of digital copying machines are lined up as such a digital copying machine.

The following Table 2 shows one example of image editing functions that are provided in the digital copying machines 91 through 94.

TABLE 2

| IMAGE EDITING FUNCTIONS | COPYING MACHINES | | | |
|---|---|---|---|---|
| | 91 | 92 | 93 | 94 |
| Independent changes in magnifications | O | O | O | O |
| Sharpness | | O | O | O |
| Margin for binding | O | O | O | O |
| Erasure of frame | O | O | O | O |
| Centering | | O | O | O |
| 2 copies in one set | | O | O | O |
| Address copy | | | O | O |
| Multi-shot | | O | O | O |
| Trimming, Masking | | O | O | O |
| Shifting function | | O | O | O |
| Composite function | | | O | O |
| Black-White inversion, Net process | O | O | O | O |
| Shading, Framing | | | O | O |
| Slanted image, Mirror image | | | O | O |
| Repeat copy | O | O | O | O |
| 2 in 1 copy | | | O | O |
| Dated copy, Center mark | | | O | O |
| Enlarged divisional output | | | | O |
| Translation | | | | O |
| High image quality process | | | | O |
| Change in magnification | O | O | O | O |
| Rotation | | | O | O |

The foregoing function information is stored in respective memories of the digital copying machines 91 through 94. Such storage is carried out, when turning on the image forming system, by exchanging the function information between the digital copying machines 91 through 94. Alternatively, such storage may be carried out, when turning on each digital copying machine, by transmitting through the communication apparatus the foregoing image processing function that has been owned by a digital copying machine to the other digital copying machines.

According to the present image forming system, as shown in FIG. 11, the digital copying machine 94, which has the most image processing functions and the memory 73 having a large storing capacity, is regarded as a main digital copying machine. This main digital copying machine 94 is operatively connected to the other digital copying machines 91 through 93, the scanner 95, and the printer 96, respectively.

With the arrangement, according to the present image forming system, image data, kept by any one of the digital copying machines 91 through 94, is processed by the respective image data processing sections 71 of the digital copying machines in a parallel manner, i.e., in a distributed manner. Such an image data is, for example, image data of a document obtained in response to the scanner section 31. The image data that has been already processed is returned to the digital copying machine that has requested to carry out such distributed processing so as to be recorded by the laser printer section 32. The following description deals with these operations with reference to FIG. 15.

Here, it is assumed that (1) the digital copying machine 91 requests the digital copying machines 92 and 93 to carry out the foregoing distributed processing, (2) "sharpness" processing is requested by the digital copying machine 91 so as to emphasize an image, and (3) the present image forming system displays the functions, which are respectively owned by other digital copying machines, on the function setting screen of the respective liquid crystal displays 1 of any one of digital copying machines.

First, when the function setting key 101a is pressed on the basic screen of the liquid crystal display 1 shown in FIG. 6(a), the screen of the liquid crystal display 1 is switched to the first function setting screen as shown in FIG. 6(b). At this stage, when the next page key is pressed, the screen of the liquid crystal display 1 is switched to the second function setting screen as shown in FIG. 6(c). On the second function setting screen, when a "sharpness" key 103c is pressed so as to select "sharpness" function (S1), a sharpness function setting region is displayed in an inverted manner (see FIG. 13(a)), thereby enabling to confirm that the "sharpness" function has been duly selected.

Then, it is judged by the PCU 74 in the digital copying machine 91 (1) which is a digital copying machine having the "sharpness" function among the digital copying machines 91 through 94 in the image forming system and (2) what is each image processing capability of the digital copying machines 91 through 94 (S2).

In such a case, since the digital copying machine 91 has no "sharpness" function, as shown in Table 2 (S3), the PCU 74 displays on the liquid crystal display 1 that the present digital copying machine has no "sharpness" function, and confirms on the liquid crystal display 1 whether or not the other digital copying machines in the present image forming system should carry out such a "sharpness" function (S4). FIG. 13(b) shows how to display on the liquid crystal display 1 for such a case.

When instructions, for carrying out the "sharpness" function with respect to image data, is entered through the digital copying machine 91, the "sharpness" function is inevitably carried out by the other digital copying machines, i.e., by the digital copying machines 92 through 94. This is because the digital copying machine 91 has no such a "sharpness" function. However, the present image forming system is arranged so as to confirm through S4 the operator whether or not such a request for carrying out the "sharpness" function should be made to the digital copying machines 92 through 94.

When the operator does not wish the digital copying machines 92 through 94 to carry out the "sharpness" function and press a cancellation key 122b (S5), the PCU 74 cancels the setting mode for the foregoing image processing request (S6).

In contrast, when the operator presses a system selection key 122a (S5), the PCU 74 determines by which digital copying machines the "sharpness" function should be carried out in accordance with the operation of S2 (S7). For the present example, the digital copying machines 92 and 93 are selected. This causes the screen on the liquid crystal display 1 is switched to the sharpness function setting screen shown in FIG. 13(c).

On the display screen, the operator presses a sharpness entering key 116a so that an emphasis level of "sharpness" is entered. Thereafter, when the operator further presses a setting completion key 116b, image data to be processed is divided into by the PCU 74 in,accordance with the number of the digital copying machines by which such image data is processed in a distributed manner. For the present example, image data is divided into two based on the fact that such a distributed processing is carried out by the digital copying machines 92 and 93. This type of division of image data is carried out for each page. More specifically, in the case where image data contains an amount of 10 (ten) pages, the image data is divided into two, i.e., each amount of five pages. The PCU 74 assigns control information for each divided image data, carries out scrambling processing (later described), and thereafter transmits them to the digital copying machines 92 and 93, respectively (S8).

The control information includes processing information for instructing to carry out the "sharpness" processing, and information relating to where already processed image information should be transmitted (for convenience, hereinafter referred to as final transmission address information). The transmitting of image data is carried out through the interface 91*a*, the telecommunication n line 97, and the interfaces 92*a* and 93*a*.

Here, image data to be processed corresponds to image data that has been scanned and read by the scanner section 31. The digital copying machine 91 has no page memory but has mere line memories. Accordingly, image data read line by line is transmitted line by line.

During the transmission, when using general-purpose networks, it is likely that image data leaks outside. For example, since any persons (not specified person) can access such general-purpose networks, it is likely that data on the general-purpose networks is read, without permission, by a person as known from criminality made by hackers. In the light of the fact, it is preferable that data on the networks is subject to data conversion such as the scrambling processing so that the data is not read, without permission, by any persons. Because of this, the present image forming system adopts such scrambling processing.

When having received the image data, the digital copying machines 92 and 93 releases the scrambling processing, and confirms the image data and the requested control information. The image data processing section 71 carries out the "sharpness" processing with respect to the received data in accordance with the requested content (S9).

Thereafter, the image data that has been processed by the digital copying machines 92 and 93 is returned to the digital copying machine 91. The returning of such processed image data is carried out not immediately after it has just been allowed to return the processed image data but after the returning is requested by the digital copying machine 91 (S10).

Such a returning request is transmitted to the digital copying machines 92 and 93 when it has been allowed for the digital copying machine 91 to proceed in the laser printer section 32. This is because the digital copying machine 91 has no page memory for storing the already processed image data which has been returned from the digital copying machines 92 and 93.

When having received from the digital copying machine 91 the request for returning processed image data at S10, the digital copying machines 92 and 93 carry out the scrambling processing with respect to the already processed image data, and then returns to the digital copying machine 91 in accordance with the final transmission address information in reverse order of the foregoing procedures (S11).

When receiving the image data that have been processed, the digital copying machine 91 releases the scrambling processing (S12), and sends them to the laser printer section 32 one after another. The laser printer section 32 outputs image data on a sheet of paper as an image (S13). Such a recording operation is coincident with the foregoing description for the digital copying machine 30.

Figure 14:
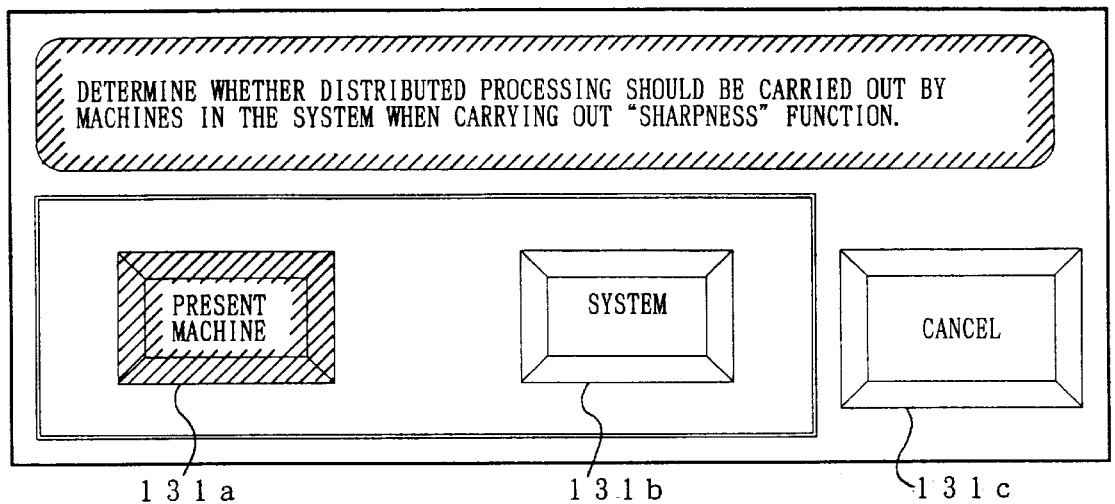
FIG. 14 is a front view showing a display state of the operation panel shown in FIG. 5 on the liquid crystal display, which corresponds to the operation at S14 shown in FIG. 15.

In S3, when the present digital copying machine has "sharpness" function, as shown in FIG. 14, the PCU 74 displays on the liquid crystal display 1 that the present digital copying machine has "sharpness" function, and confirms on the liquid crystal display 1 whether or not digital copying machines, other than the present one, in the present image forming system should also carry out such a "sharpness" function (S14). Note that the present digital copying machine is a digital copying machine that has "sharpness" function, i.e., for example, the digital copying machine 92.

When the operator presses a system selection key 131*b* on the display screen shown in FIG. 14 (S15), the PCU 74 of the digital copying machine 92 proceeds to S7 so as to carry out the followed procedures. Here, note that the objects to which processes are carried out are the digital copying machines 93 and 94. The digital copying machine 92 has the memory 73 with large capacity. Accordingly, it is possible that after the image data that have been processed and returned by the digital copying machines 93 and 94 are temporarily stored in the memory 73, the recording operation is carried-out while reading out the temporarily stored image data.

In contrast, when the operator presses a present machine selection key 131*a* on the display screen shown in FIG. 14 (S15), the PCU 74 of the digital copying machine 92 singly carries out the "sharpness" process without requesting the other digital copying machines to carry out the "sharpness" process (S16). Thereafter, the image is recorded by the laser printer section 32 of the present digital copying machine (S13).

When the operator presses a cancellation key 131*c* on the display screen shown in FIG. 14, the PCU 74 terminates a series of image processing operations concerning the "sharpness".

As mentioned above, according to the present image forming system, when the image processing function that the digital copying machine 91 does not have is selected, such a selected image processing function can be carried out in a distributed manner by the other digital copying machines. Accordingly, it is not necessary for all the digital copying machines in the image forming system to have excellent image processing functions, respectively. Furthermore, the image processing is carried out in a distributed manner by a plurality of digital copying machines, thereby ensuring quick image processing.

Figure 15:
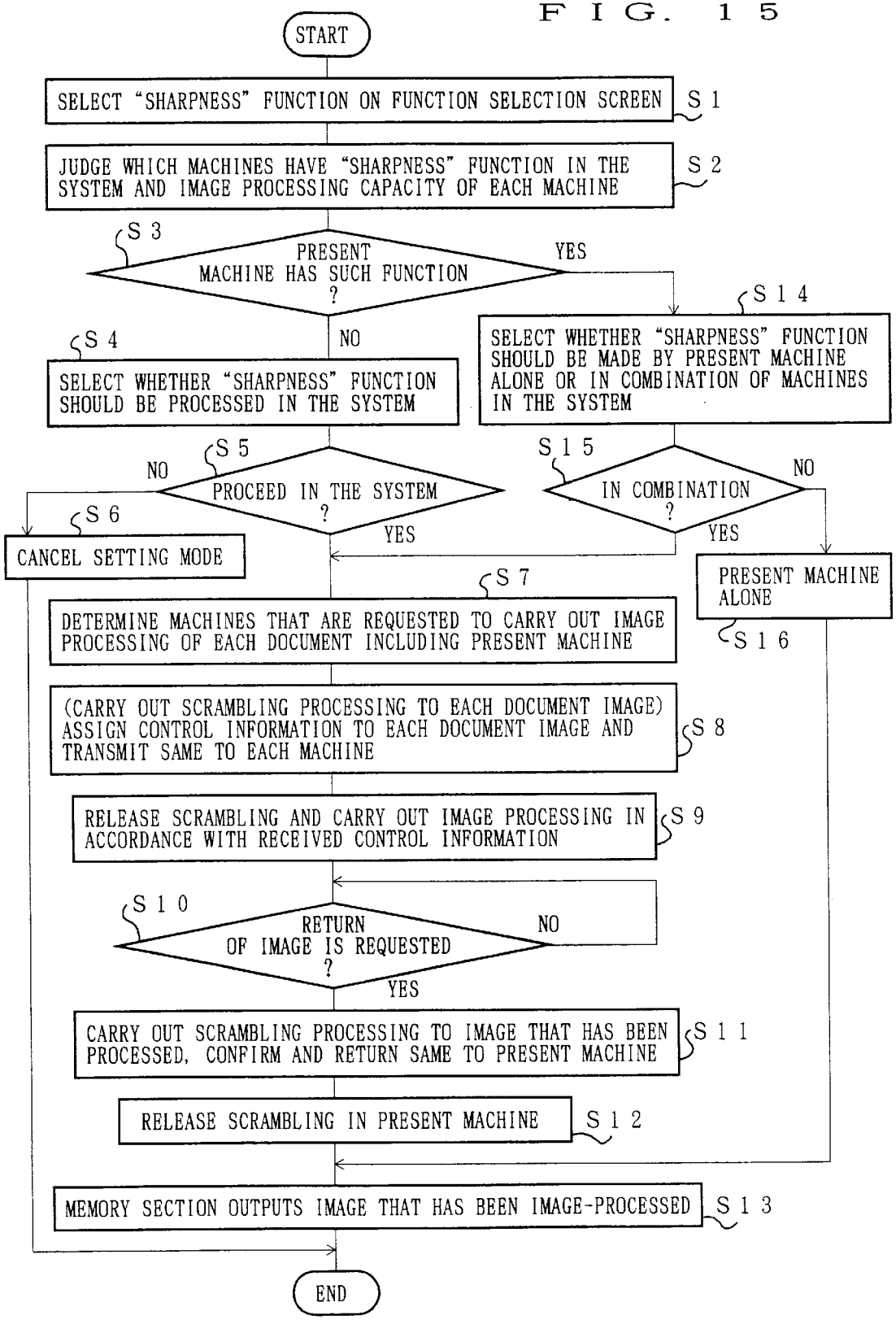
FIG. 15 is a flow chart showing a distributed operation of the image processing in the image forming system shown in FIG. 11.

According to the example shown in FIG. 15, the already processed image data is returned to the digital copying machine 91 that requested the other digital copying machines to carry out such a processing, and the digital copying machine 91 outputs an image. However, instead of this arrangement, it is possible to select the digital copying machines to which the already processed image data is returned, depending on various conditions so that the selected digital copying machines or their printers output an image.

Further, the example sets two digital copying machines which are requested to carry out the process in a distributed manner. However, the number of the digital copying machines which are requested to carry out the process in a distributed manner is not limited provided that the number is plural. For example, the number may be set in accordance with the amount of image data.

The foregoing description deals with the case where the objects are the digital copying machines 91 through 94. However, since a combination of the scanner 95 and the printer 96 can also have a function of a digital copying machine, such a combination can be an object like a digital copying machine. In such a case, for example, color image data, which have been obtained by the reading of the scanner 95, having a resolution of 600 DPI are transmitted to the digital copying machine 93 so as to be image-processed, thereafter the image-processed image data are returned to the printer 96 having a recording resolution of 600 DPI so as to be printed out. Thus, the processing similar to that of the digital copying machine can be carried out.

In general, when obtaining an image forming system wherein a digital copying machine having relatively high functions is combined with a digital copying machine having relatively low functions, it is likely that they are different from each other in the levels of image processing, the recording resolution, etc. Therefore, when the foregoing image processing is carried out, for example, for each page in a distributed manner by such plural digital copying machines having respective different functions, the following inexpedience arises. More specifically, the level of such as image quality of the image recorded finally on a sheet of paper or of the image etc. on the display screen differs from page to page. In order to meet such inexpedience, according to the present image forming system, even when a plurality of digital copying machines carry out the foregoing image processing in a distributed manner, it is ensured, irrespective of pages, to obtain substantially uniform level of such as image quality of the image recorded finally on a sheet of paper or of the image etc. on the display screen. A purpose of this is to avoid giving unnatural feelings to the person who watches the image that has been processed. The following description deals with concrete operations for achieving such a purpose.

In the image forming system shown in FIG. 11, the respective functions of the digital copying machines 91 through 94 are not coincident with each other as is clear from Table 3. Namely, the reading resolution of the scanner 31 is 400 DPI for the digital copying machines 91 through 93 while 600 DPI for the digital copying machine 94. The level of image processing in software version is version 1.2 for the digital copying machines 92 and 93 while version 2.0 for the digital copying machine 94. The recording resolution of the laser printer section 32 is fixed to 400 DPI for the digital copying machines 91 through while either 400 DPI or 600 DPI can be selected as the recording resolution of the digital copying machine 94.

TABLE 3

| | Digital Copying Machine | | | |
| --- | --- | --- | --- | --- |
| | 91 | 92 | 93 | 94 |
| Reading Resolution | 400 DPI | 400 DPI | 400 DPI | 600 DPI |
| Image Processing Level | — | Ver. 1.2 | Ver. 1.2 | Ver. 2.0 |
| Recording Resolution | 400 DPI | 400 DPI | 400 DPI | 400/600 DPI |

First, the following description deals with a case where a predetermined digital copying machine requests other plural digital copying machines to carry out image processing in a distributed manner. Here, it is assumed that each digital copying machine which is requested to carry out the image processing carries out each processing in accordance with a specified level of processing capacity. This operation corresponds to a case where the operator instructs the digital copying machine 91 to carry out "sharpness" processing, with respect to the image data of a document read by the scanner section 31, which the digital copying machine 91 can not carry out. Note that it is assumed in this operation that the image processing is automatically carried out by the image forming system without confirming the operator whether or not such a distributed image processing should be carried out.

Figure 1:
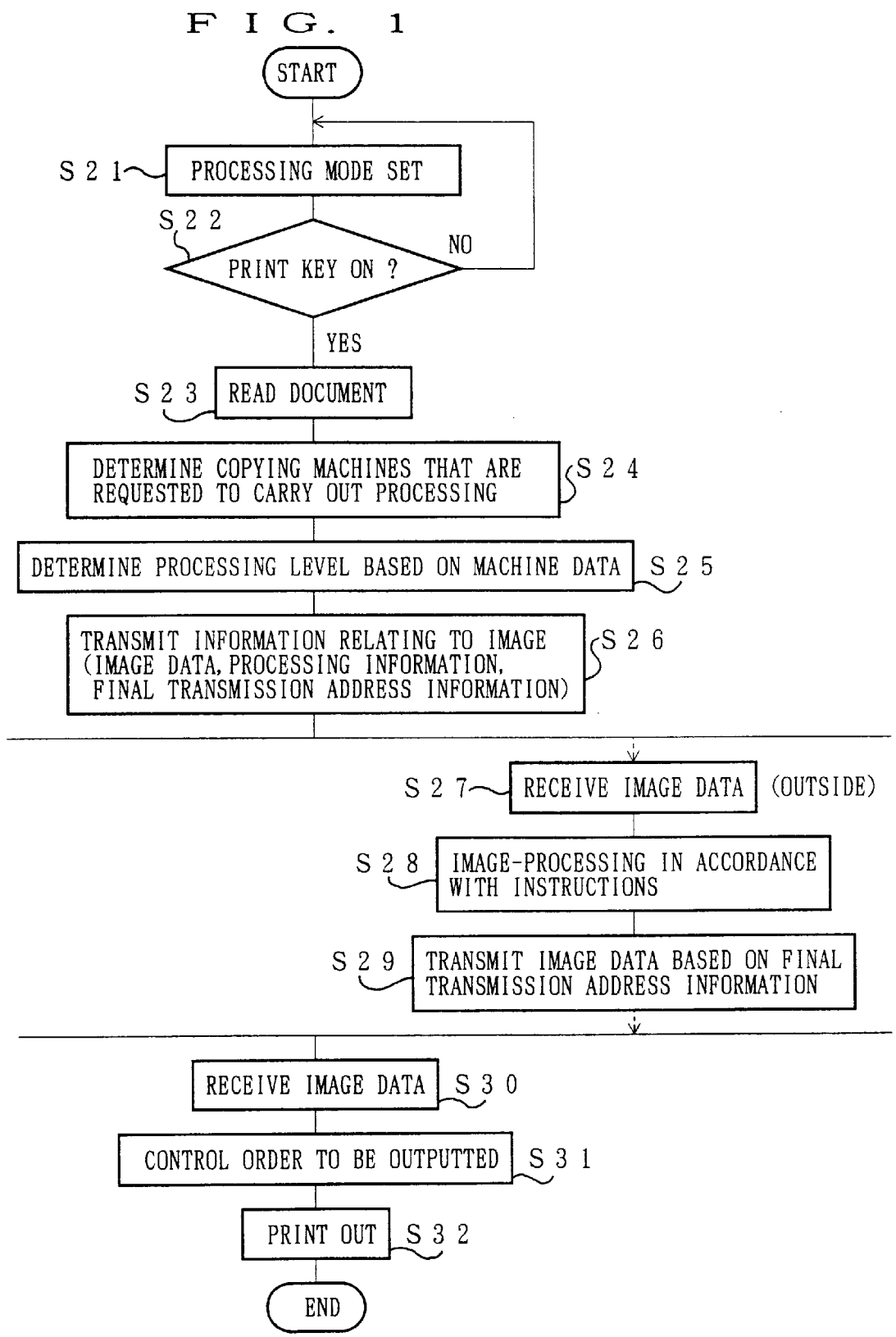
FIG. 1 is a flow chart showing operations of an image forming system of one embodiment in accordance with the present invention, more specifically showing operations of the case where a copying machine that has been instructed to carry out an image process requests other plural copying machines to carry out the image process in a distributed manner.

First, as shown in FIG. 1, in the digital copying machine 91, the operator sets processing mode such as "sharpness" processing (S21). When the start key 15 is pressed (S22), the scanner section 31 starts to read a document image (S23).

Then, the PCU 74 selects in accordance with the function information digital copying machines, which can be requested to carry out "sharpness" processing, among the digital copying machines 92 through 94 (S24). As to the "sharpness" processing, any of the digital copying machines 92 through 94 can carry out the "sharpness" processing (see Table 2). For convenience, here, the PCU 74 selects the digital copying machines 93 and 94. Note that the number of the digital copying machines which are requested to carry out such "sharpness" processing in a distributed manner is not limited. For example, the PCU 74 may select all the digital copying machines 92 through 94.

Then, the PCU 74 determines a target processing level in accordance with the function information of the digital copying machines 93 and 94 (S25). The processing level corresponds to respective predetermined levels of processing capacity which the digital copying machines 93 and 94 have. In such a case, the processing level may fall within a permissible range, i.e., may have a deviation. Accordingly, when a plurality of digital copying machines, which can be requested to carry out "sharpness" processing, do not have exactly the same single level of processing capacity but each can carry out processing with substantially the same level of processing capacity, it is possible to set the substantially the same level of processing capacity as the foregoing target processing level.

Information relating to image is then transmitted to the digital copying machines 93 and 94 (S26). The Information is provided by adding image data to (a) processing information indicating the type of image processing to be carried out and a target processing level and (b) final transmission address information corresponding to information instructing to return image data that has been processed to the digital copying machine 91 is added to the image data. During the transmitting, as has been described in the operations of S8, image data is divided, for example for each page, in accordance with the number of the digital copying machines which are requested to carry out the processing in a distributed manner, and such divided image data are individually transmitted to the digital copying machines 93 and 94.

The divided image data are received by the digital copying machines 93 and 94, respectively (S27). The digital copying machines 93 and 94 respectively carry out the specified image processing with respect to the received image data in accordance with the processing information, i.e., in accordance with the specified processing level (S28). This processing is carried out by each image data processing section 71.

Then, the digital copying machines 93 and 94 transmit respective image data that have been processed to the digital copying machine 91 in accordance with the final transmission address information (S29).

The digital copying machine 91 receives the respective image data that have been processed (S30), and the respective image data are recorded on a sheet of paper (S32) after controlling the order to be outputted (S31). Note that since the digital copying machine 91 does not have a page memory, the digital copying machines 93 and 94 transmit the respective image data so that the image data are arranged in page order, thereby controlling the order to be outputted. In contrast, such a processing is not necessary when the digital copying machine to which the image data finally transmitted is, for example, the digital copying machine 92 that has a page memory temporarily storing image data that has been processed.

Note that it is preferable to set the processing level at S25 to the lowest level of the processing levels that the digital copying machines 93 and 94 have. When requesting a process to be carried out in accordance with Ver. 2.0 (see Table 3), the digital copying machine 94 can only carry out the process. When requesting a process to be carried out in accordance with Ver. 1.2, the digital copying machines 92 through 94 can carry out the process. In such a case, Ver. 2.0 of the digital copying machine 94 is higher than Ver. 1.2, and thus the higher version can be compatible with the lower version. Accordingly, it is possible for an extensive range of digital copying machines to carry out such a process by setting a processing level to the lowest level.

Further, in order to obtain a good recording image, it is preferable to set the processing level to a level of outputting capacity such as recording capacity of the digital copying machine 91 which records image data that has been processed on a sheet of paper.

More specifically, the digital copying machine 93 has a recording resolution of 400 DPI, and the recording resolution of the digital copying machine 94 can be switched either to 400 DPI or 600 DPI. Accordingly, the image data that has been image-processed by the digital copying machine 93 is processed as data that can be recorded with 400 DPI. Similarly, in the image processing of the digital copying machine 94, when specifying that image data is recorded so as to have a recording resolution of 400 DPI, the image data is processed so as to be a data which is recordable with 400 DPI. Accordingly, it is possible, without changing a clock frequency and other parameters, to record the data with 400 DPI as it is, thereby presenting a good image. This can avoid that the digital copying machines 93 and 94 carry out image processings with higher processing levels which the digital copying machine 91 can not deal with and that such image processings with higher processing levels are likely to be in vain.

The following description deals with how the digital copying machine 94 changes the processing levels so as to carry out an image processing with a lower Ver. 1.2, not with Ver. 2.0 which has been built in the digital copying machine 94 as its software.

An operation for judging of edges of image (hereinafter referred to as an image edge judging operation) is provided here as an example. Such an image edge judging operation is well known, i.e., for example, is disclosed in the foregoing examined Japanese patent publication No. 80192/1993 (Tokukouhei 5-80192). According to the examined Japanese patent publication, a detection circuit detecting differences and isolated points is adopted so as to judge edges of image by judging density difference between each pixel and peripheral pixels. According to the detection circuit, when judging an appearance frequency or an appearance pattern of isolated points with respect to both a primary scanning direction and an auxiliary scanning direction, much higher accurate judgement can be ensured. Therefore, this first method can be adopted in an image processing apparatus having a high processing speed. The first method corresponds to the foregoing processing with Ver. 2.0.

In contrast, the following second method may be substituted for the first method. According to the second method, edges of image is judged by judging an appearance frequency or an appearance pattern of isolated points with respect to only a primary scanning direction. Though the accuracy of the second method deteriorates, it is possible to carry out the judgement in a shorter time as compared to the first method. The second method is suitable for an image processing apparatus having a low processing speed, and corresponds to the foregoing processing with Ver. 1.2.

Accordingly, in the above-mentioned example, when an image processing apparatus having Ver. 2.0 carries out a processing with Ver. 1.2, the following change is required. More specifically, it is required to modify the first method, wherein the processing is carried out with respect to both a primary scanning direction and an auxiliary scanning direction, in accordance with the second method wherein the processing is carried out, for example, with respect to only an auxiliary scanning direction. Note that such modification can be made with ease. Thus, in general, an image processing apparatus having higher processing levels are compatible with an image processing apparatus having lower processing levels with ease.

A level of density conversion is another example to be modified in accordance with modifying processing levels. A circuit that converts density of image is provided with a plurality of density conversion tables that is used during converting density data of image. A variety of processing levels are set in accordance with how such density conversion tables are prepared in multistage and how such density conversion tables are prepared in accordance with the types of such as photographs, characters, and images mixed with photographs and characters. Namely, density conversion tables are prepared in more multistage for a digital copying machine having a higher version than for a digital copying machine having a lower version. Accordingly, when reducing the conversion tables in accordance with the lower version in a digital copying machine having such a higher version, it is possible to make the processing level be substantially coincident with that of a digital copying machine having such a lower version.

There have been proposed several methods for converting density of image with such a density conversion table. One of those methods is disclosed in examined Japanese patent publication No. 69211/1994 (Tokukouhei 6-69211). According to this method, a density conversion table is used for correcting the density data of an input image so as to be converted into corrected density data for output image. Such a density conversion table is realized by rewritable memories. These corrected density data are prepared in accordance with the types of input image such as photographs, characters, or illustrations.

Note that the recording capacity of the rewritable memories becomes large as the density conversion tables are prepared in more multistage, thereby raising the cost of the apparatus. Alternatively, it is possible to calculate a density conversion table in accordance with the need so as to avoid that the recording capacity of the rewritable memories becomes large. However, this is not suitable for an apparatus having a high processing speed because the calculating speed becomes slow in proportion to such every calculation. In contrast, year by year, the price of a rewritable memory has been cheaper while the recording capacity has been larger. Accordingly, at each time a copying machine has been newly commercialized, its image processing level such as density conversion function has been upgraded.

Gradation is a further example to be modified in accordance with modification of processing levels. The gradation is provided by an error dispersion processing of image data. When image data is processed by the error dispersion processing while broadening dispersion area within an appropriate range, such processed image data is recognized as a clear half tone image by a person who watches it. However, it is necessary to prepare an arithmetic circuit having a high processing speed in order to repeatedly carry out calculations pixel by pixel for the error dispersion, thereby causing to raise the cost of such a copying machine. This type of copying machine corresponds to the foregoing one with Ver. 2.0. In contrast, when carrying out error dispersion processing in a range narrower than the foregoing case, it is not necessary to prepare an arithmetic circuit having a high processing speed, thereby causing to lower the cost of such a copying machine. This type of copying machine corresponds to the foregoing one with Ver. 1.2. Accordingly, when narrowing the processing area during error dispersion processing in accordance with the lower version in a digital copying machine having such a higher version, it is possible to make the processing level be substantially coincident with that of a digital copying machine having such a lower version.

Further, there is another image processing technique based on a so-called area-division wherein features of image are recognized for each area in accordance with such as photographs, characters, and images mixed with photographs and characters, and image processing is carried out in accordance with such features. The changes in the foregoing processing levels can be adapted to this type of image processing technique.

The following description deals with how to carry out conversion of resolution in the digital copying machine 94.

In ordinary, the scanner section 31 is provided with a line of line sensors that read an optical image corresponding to reflected light of the light which has been projected onto an original image. The line sensors is arranged so that photoelectric transfer devices are provided in a line. An optical image, which obtained as the reflected light of the light which has been projected onto an originalimage, is read by scanning in a primary scanning direction while moving in an auxiliary scanning direction. This ensures to read image with resolution such as 400 DPI or 600 DPI, and the image thus read is outputted from the line sensors as image data.

For example, when the line sensors correspond to a document platen having a width of document A4 size, the length in the primary scanning direction is 297 mm. In such a case, the required pixel number of CCDs can be calculated by dividing 297 mm by one inch (i.e., 25.4 mm) and multiplying the divided result by 400 DPI. According to the calculation, 4677 pixels are enough for the required pixel number of CCDs. However, a margin is practically considered. Accordingly, about 5000 pixels of CCDs are practically used. Note that when the resolution is 600 DPI, about 7500 pixels of CCDs are used.

When converting the resolution, for example, from 400 DPI to 600 DPI, interporation process of 200 DPI is carried out in accordance with pixel data before and after the object to be interporated. Namely, it is possible to obtain image data corresponding to 600 DPI by converting from two-pixel data to three-pixel data. Various interporation processes have been well known. For example, the density of a pixel to be interporated is determined in accordance with the density difference between two target pixels and data relating to a position of the pixel to be interporated. In contrast, when converting the resolution from 600 DPI to 400 DPI, it is possible to obtain image data corresponding to 400 DPI by converting from three-pixel data to two-pixel data.

Figure 16:
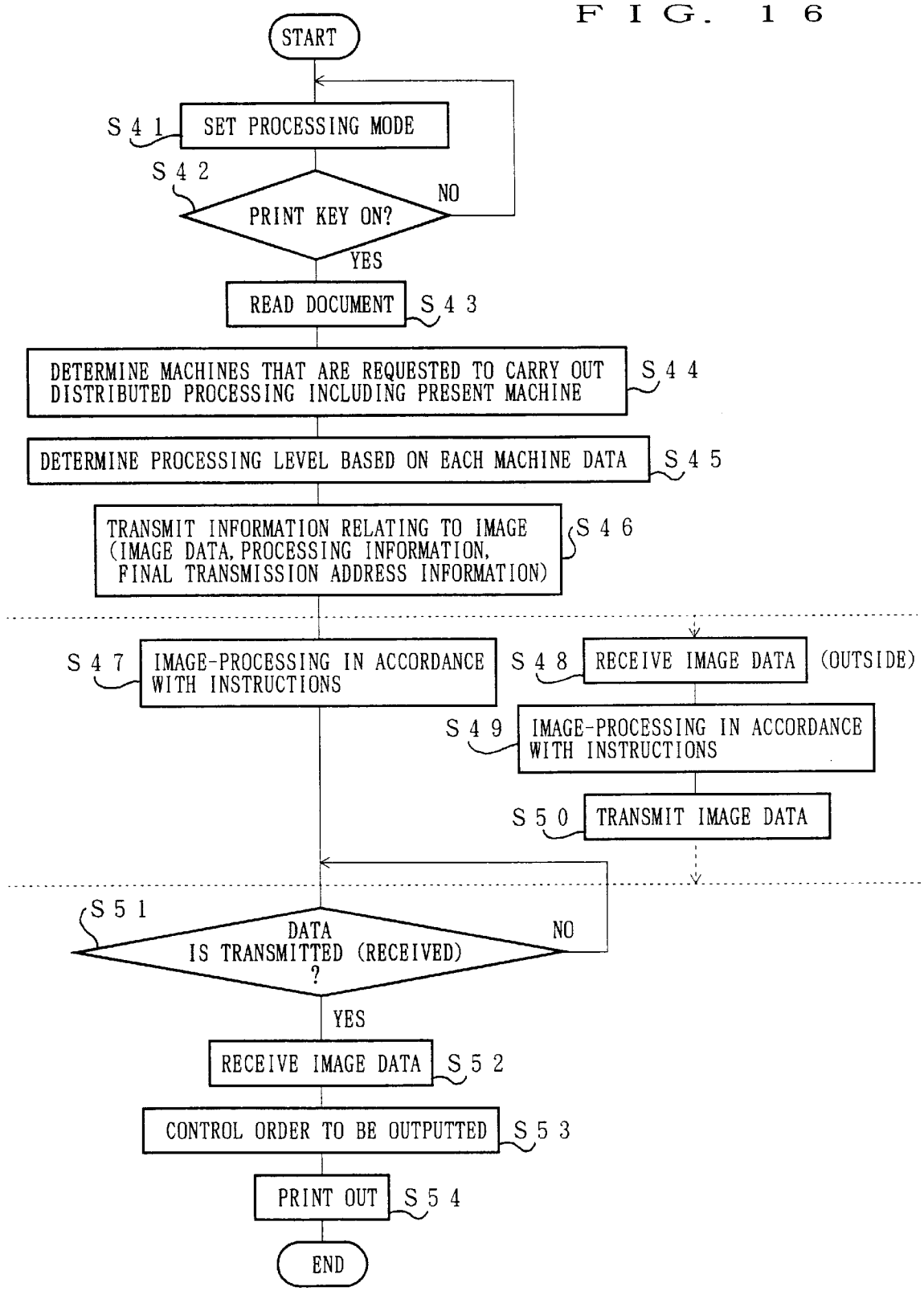
FIG. 16 is a flow chart showing another operation of FIG. 1 which the image forming system shown in FIG. 11 performs, namely showing an operation of the case where a copying machine, which has been instructed to carry out image processing, requests itself and the other copying machine(s) to carry out the image processing.

The following description deals with, with reference to FIG. 16, a case where predetermined digital copying machines carry out image processings and other digital copying machines are requested to carry out image processings with respect to one part of image data. It is assumed here like the operation shown in FIG. 1 that each digital copying machine which is requested to carry out the processing in accordance with a specified processing capacity. Such operations correspond to, for example, a case where the operator instructs the digital copying machine 92 to carry out "sharpness" processing with respect to the document image data that has been read by its scanner section 31. Note that, in the operation like the foregoing case, it is assumed that the image processing is automatically carried out by the image forming system without cofirming the operator whether or not such distributed image processing should be carried out.

First, in the digital copying machine 92, the operator sets processing mode such as "sharpness" processing (S41). When the start key 15 is pressed (S42), the scanner section 31 starts to read a document image (S43).

Then, the PCU 74 selects in accordance with the function information digital copying machines, which can be requested to carry out "sharpness" processing, among the digital copying machines 91 through 94 (S44). As to the "sharpness" processing, any of the digital copying machines 92 through 94 can carry out the "sharpness" processing (see Table 2). For convenience, here, the PCU 74 selects the digital copying machine 92 itself and the digital copying machine 94. Note that the number of the digital copying machines which are requested to carry out such "sharpness" processing in a distributed manner is not limited. For example, the PCU 74 may select all the digital copying machines 92 through 94.

Then, the PCU 74 determines a target processing level in accordance with the function information of the digital copying machines 92 and 94 (S45).

The information relating to image is then transmitted to the image data processing section 71 and to the digital copying machine 94 (S46). This is carried out in a similar manner to that of the foregoing S26.

The image data processing section 71 of the digital copying machine 92 carries out the specified image processings with respect to the received image data in accordance with the processing information, i.e., in accordance with the specified processing level (S47). The digital copying machine 94 receives the image data (S48), thereafter in a like manner of S47 its image data processing section 71 carries out the specified image processings with respect to the received image data in accordance with the specified processing level (S49). The respective processings of the digital copying machines 92 and 94 are carried out in paralell.

Then, the digital copying machine 94 transmits image data that has been processed to the digital copying machine 92 in accordance with the final transmission address information (S50).

When the digital copying machine 94 transmits the image data that has been processed from to the digital copying machine 92 (S51), then the digital copying machine 92 receives it (S52). Since the memory 73 of the digital copying machine 92 is a page memory, the memory 73 stores the received image data one after another. The memory 73 also stores the image data that has been processed by the image data processing section 71 of the digital copying machine 92.

Thereafter, the digital copying machine 92 controls the order to be outputted, i.e., the respective image data are supplied to the laser printer section 32 so that the image data are arranged in page No. order (S53), thereby recording the image data onto a sheet of paper (S54).

According to the foregoing operations, the image processing is carried out by the digital copying machine 92 itself which requests the other digital copying machines to carry out in a distributed manner. Therefore, as to image data to be processed inside the digital copying machine 92, it is not necessary to transmit and receive to and from the other digital copying machines. This causes (1) to shorten the time required for the processing, i.e., to save the time required for communications therebetween and (2) to simplify the communication operations.

Note that the following are the same as those that have been described before. More specifically, it is preferable to set the processing level to the lowest level of the processing levels that the digital copying machines 92 and 94 have respectively. It is also preferable to set the processing level in accordance with a level of recording capacity of the digital copying machine 92 such as recording resolution.

Second Embodiment

The following description deals with another embodiment in accordance with the present invention with reference to FIG. 11, and FIGS. 17 through 20.

According to the present image forming system, the following operations are carried out so that the quality of image that has been finally recorded on a sheet of paper or the quality of image displayed on the display screen acquires substantially the same level-condition throughout the respective pages in a case where the image processing is carried out in a distributed manner like the foregoing embodiment by a plurality of digital copying machines having different functions with each other.

First, the following description deals with a case where a predetermined digital copying machine requests other plural digital copying machines to carry out image processing. Here, it is assumed that each digital copying machine which is requested to carry out the image processing carries out each processing in accordance with a specified processing level with substantially the same processing level. This operation corresponds to a case where the operator instructs the digital copying machine 91 to carry out "sharpness" processing, with respect to the image data of a document read by the scanner section 31, which the digital copying machine 91 can not carry out. Note that it is assumed in this operation that the image processing is automatically carried out by the image forming system without cofirming the operator whether or not such distributed image processing should be carried out.

Figure 17:
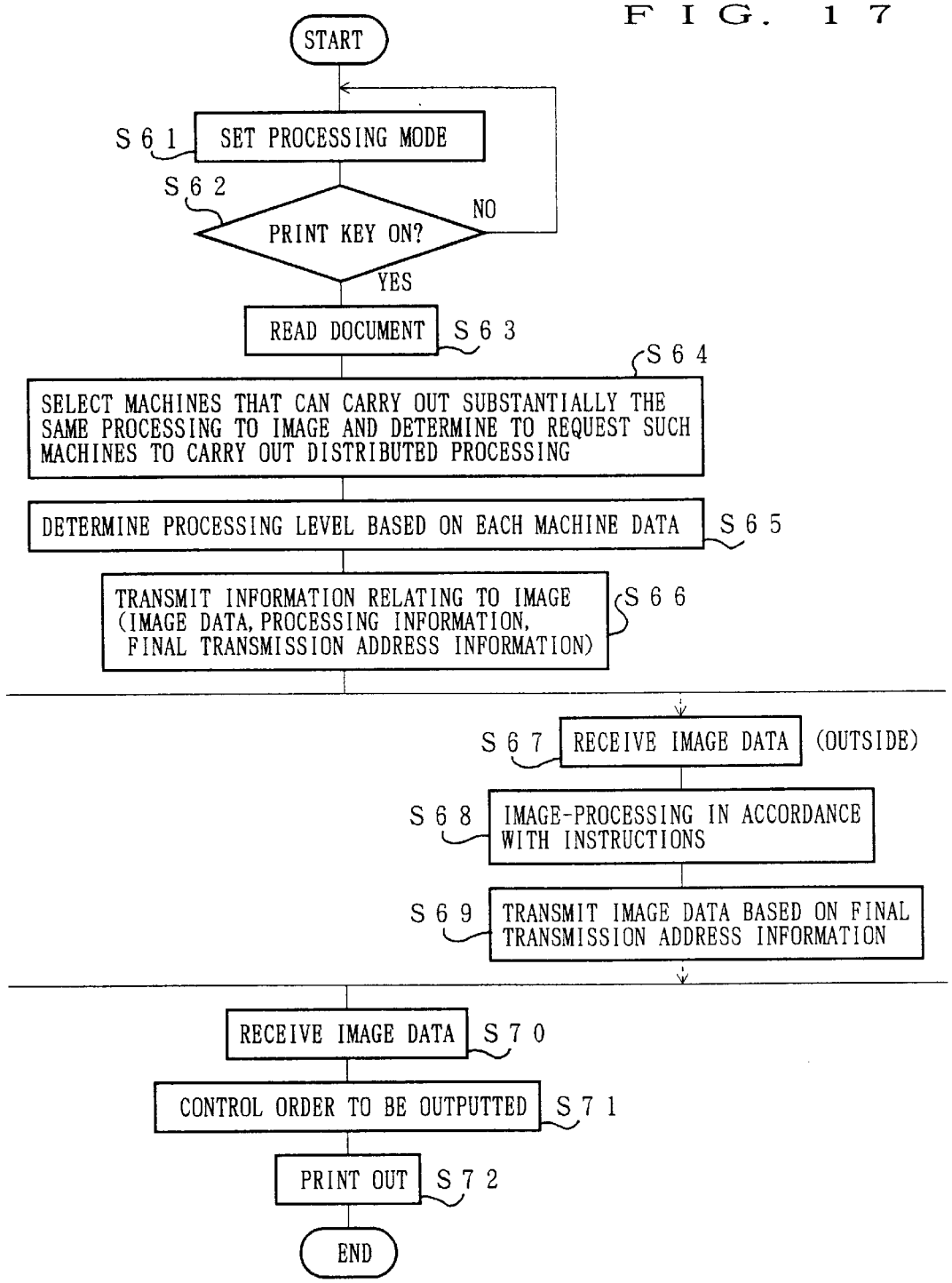
FIG. 17 is a flow chart showing an operation of another image forming system of another embodiment in accordance with the present invention, nemely showing an operation of the case where a copying machine, which has been instructed to carry out image processing, requests other copying machines to carry out the image processing.

First, as shown in FIG. 17, in the digital copying machine 91, the operator sets processing mode such as "sharpness" processing (S61). When the start key 15 is pressed (S62), the scanner section 31 starts to read a document image (S63).

Then, in accordance with the foregoing function information the PCU 74 selects digital copying machines, which can be requested to carry out "sharpness" processing, among the digital copying machines 92 through 94 (S64). As to the "sharpness" processing, any of the digital copying machines 92 through 94 can carry out the "sharpness" processing (see Table 2). Any of the digital copying machines 92 through 94 can carry out the image processing with substantially the same processing level. In contrast, as to the digital copying machine 94, it is necessary to modify the processing level as has been described before. In view of the fact, for convenience, here, the PCU 74 selects the digital copying machines 92 and 93. Note that the number of the digital copying machines which are requested to carry out such "sharpness" processing in a distributed manner is not limited.

Then, the PCU 74 determines a target processing level in accordance with the function information of the digital copying machines 92 and 93 (S65).

Thereafter, the operations from S66 to S72 are the same as those from S26 to S32 as shown in FIG. 1.

According to the present operation, in contrast to the operation of FIG. 1, it is necessary to select, beforehand, digital copying machines that have substantially the same processing level, while it is not necessary to carry out conversion of processing levels of the digital copying machines that have been requested to carry out the processing in a distributed manner.

Note that the following are the same as those that have been described before. More specifically, it is preferable to set the processing level to the lowest level of the processing levels that the digital copying machines 92 and 93 have. It is also preferable to set the processing level in accordance with a level of recording capacity of the digital copying machine 91 such as recording resolution.

Figure 18:
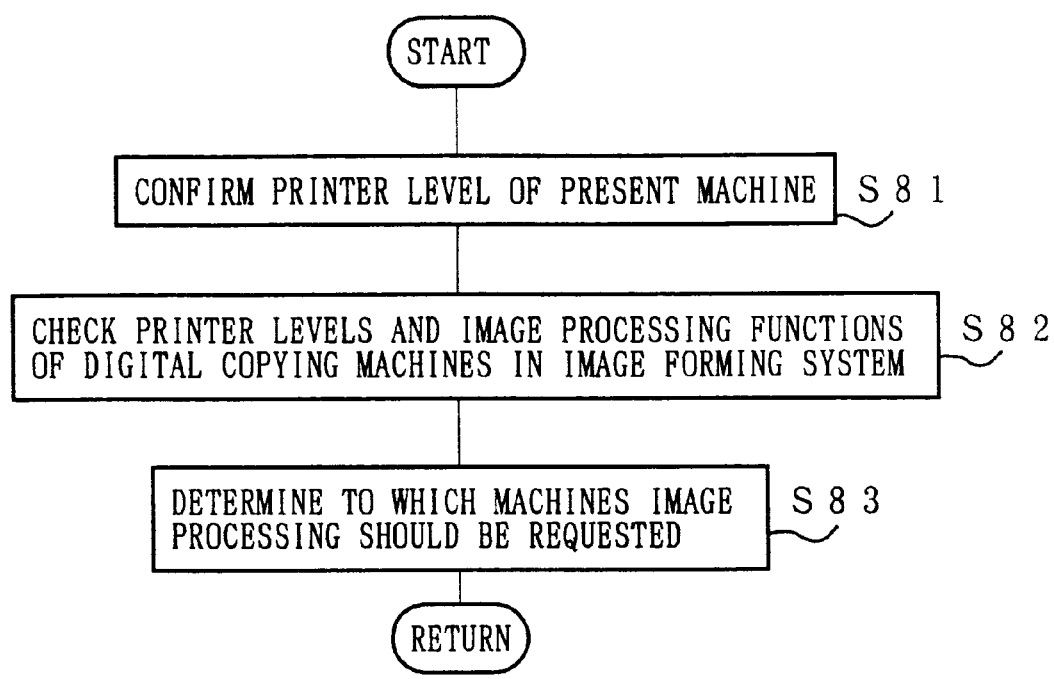
FIG. 18 is a flow chart explaining the operation of S64 shown in FIG. 17.

The following description deals with, with reference to FIG. 18, the operations of a case where the selection operation, during S64, of the digital copying machines which have been requested to carry out the processing in a distributed manner is carried out in accordance with a level of the recording capacity of the digital copying machine 91.

First, a level (printer level) of the recording capacity of the laser printer section 32 inside the digital copying machine 91, i.e., recording resolution of the laser printer section 32 is confirmed (S81).

Then, (1) each level of the recording capacity of the laser printer sections 32 inside the digital copying machines 92 through 94 and (2) the processing level of the foregoing image processing are confirmed (S82).

Thereafter, in accordance with the information obtained during S81 and S82, digital copying machines, whose laser printer sections 32 have substantially the same level of recording capacity as that of the digital copying machine 91 and which can carry out processing in accordance with the processing level corresponding to the level of recording capacity, are selected among the digital copying machines 92 through 94 (S83).

Figure 19:
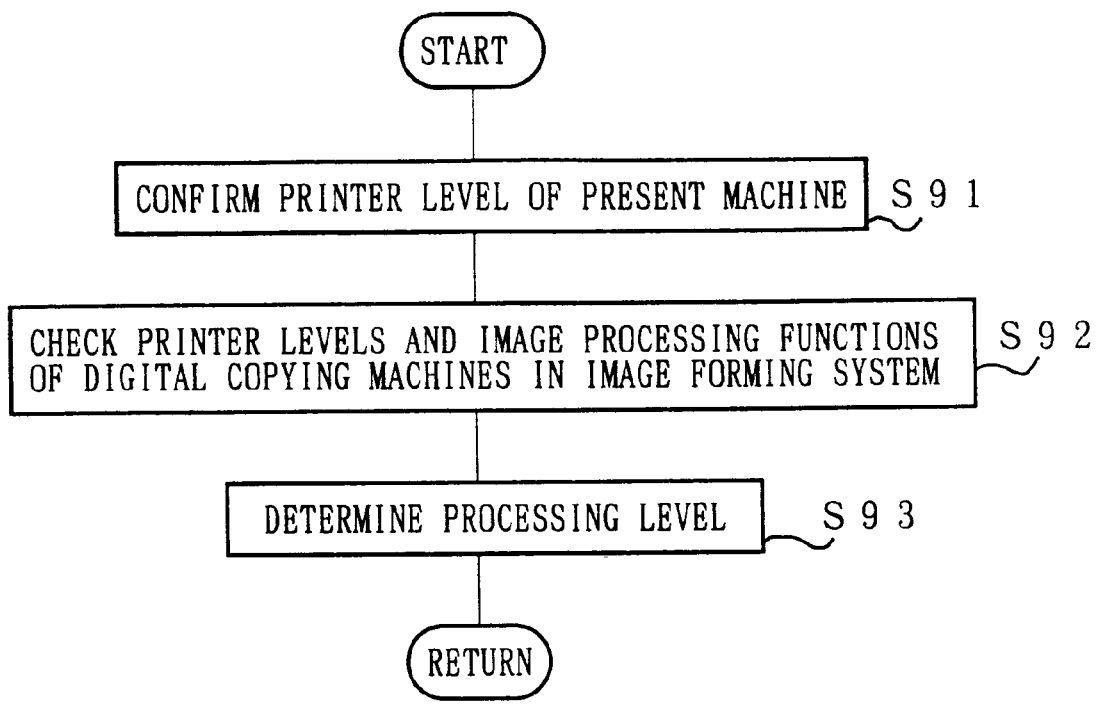
FIG. 19 is a flow chart explaining the operation of S65 shown in FIG. 17.

The following description deals with, with reference to FIG. 19, how to determine the processing level during S65 in accordance with the level of recording capacity of the digital copying machine 91.

First, a level (printer level) of the recording capacity of the laser printer section 32 inside the digital copying machine 91, i.e., recording resolution of the laser printer section 32 is confirmed (S91).

Then, (1) each level of the recording capacity of the laser printer sections 32 inside the digital copying machines 92 through 94 and (2) the processing level of the foregoing image processing are confirmed (S92).

Thereafter, the foregoing processing level is determined in accordance with the information obtained during S91 and S92 (S93).

The image forming system is arranged so that (1) the digital copying machines which are requested to carry out the distributed processings and (2) the processing levels are selected in accordance with the level of recording capacity of the laser printer section 32 in the digital copying machine 91, i.e., the copying machine of FIGS. 18 and 19 which requests the other copying machines to carry out the distributed image processing. Such an arrangement is provided based on the following reasons.

When the processing levels are determined in accordance with the level of recording capacity of laser printer section 32 in the digital copying machine 91, it is not necessary for the image data that has been processed to further proceed such image data so as to be recorded by the laser printer section 32, thereby simplifying the recording operation. It is also avoided that some image processings are carried out for a long time with a high processing level that exceeds the recording capacity of the laser printer section 32 in the digital copying machine 91. Therefore, it is avoidable that the image processings with such a high processing level become wasteful.

More specifically, by carrying out the procedures shown in FIGS. 18 and 19, the digital copying machines that have the same recording resolution as that of the digital copying machine 91 are selected according to Table 3, i.e., the digital copying machines 92 and 93 are selected. In such a case, the respective image data that have been processed by the digital copying machines 92 and 93 correspond to the level of the recording capacity of the copying machine 91, i.e., correspond to 400 DPI.

Figure 20:
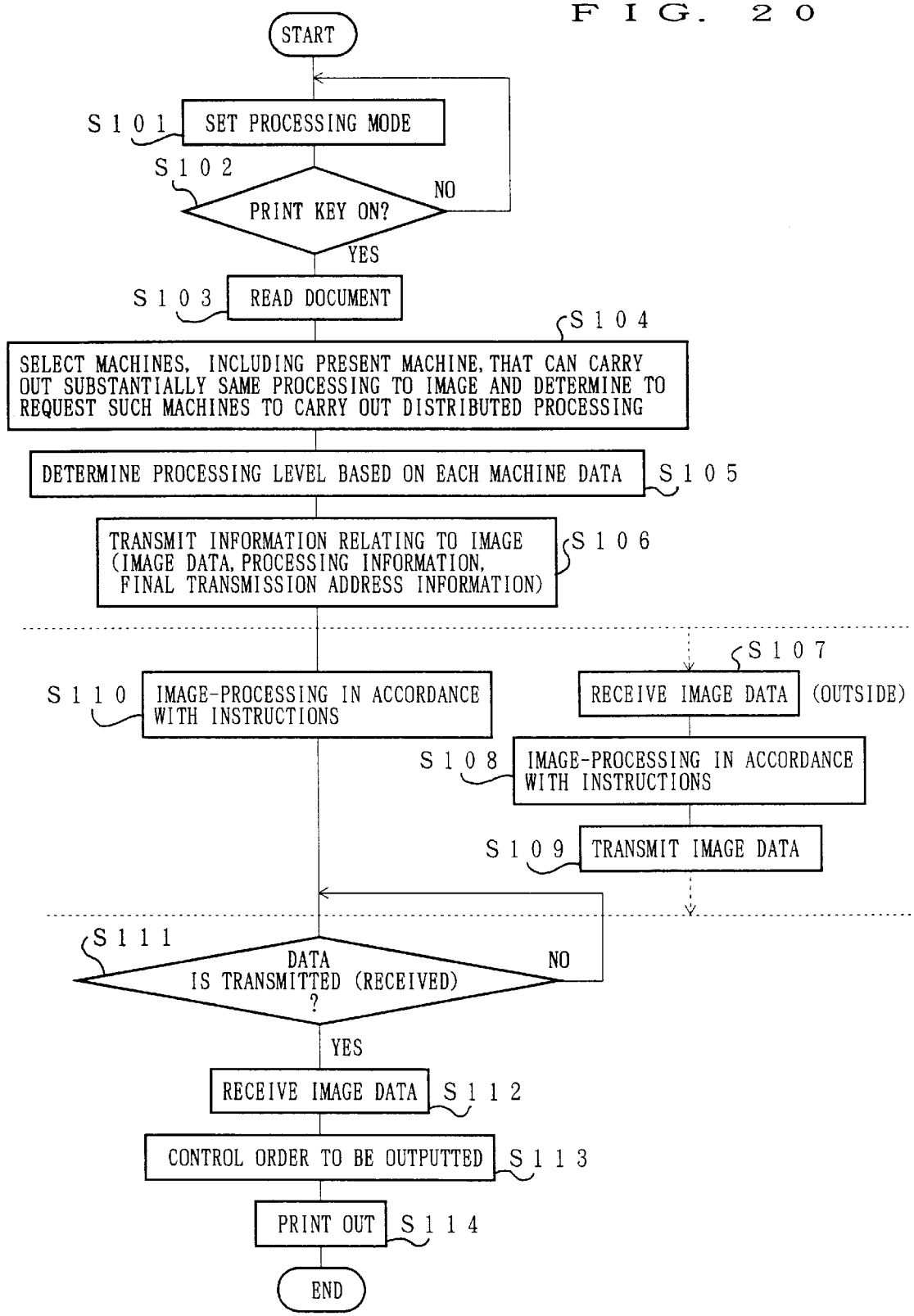
FIG. 20 is a flow chart showing another operation of FIG. 17 which the image forming system shown in FIG. 11 performs, namely showing an operation of the case where a copying machine, which has been instructed to carry out image processing, requests itself and other copying machine(s) to carry out the image processing.

The following description deals with the case where (1) image processing is carried out by a predetermined digital copying machine and (2) another digital copying machine is requested to carry out image processing with respect to one part of image data with reference to FIG. 20. Here, as is similar to the operations of FIG. 17, it is assumed that a predetermined digital copying machine selects a plurality of digital copying machines, including the predetermined digital copying machine itself, which are requested to carry out a specified image processing with substantially the same processing level. This operation corresponds to a case where the operator instructs the digital copying machine 92 to carry out "sharpness" processing with respect to the image data of a document read by the scanner section 31.

First, in the digital copying machine 92, the operator sets processing mode such as "sharpness" processing (S101). When the start key 15 is pressed (S102), the scanner section 31 starts to read a document image (S103).

Then, in accordance with the foregoing function information the PCU 74 selects digital copying machines, which can be requested to carry out "sharpness" processing with substantially the same processing level, among the digital copying machines 91 through 94 including the digital copying machine 92 (S104). In view of the fact, for convenience, here, the PCU 74 selects the digital copying machines 92 and 93. Note that the number of the digital copying machines which are requested to carry out such "sharpness" processing with substantially the same processing level in a distributed manner is not limited.

Then, the PCU 74 determines a target processing level in accordance with the function information of the digital copying machines 92 and 93 (S105).

The operations of S106 through S114 are carried out in a similar manner to those of S26 through S32 shown in FIG. 1.

In contrast to the operations shown in FIG. 1, it is necessary in the operations to select digital copying machines that have substantially the same processing level beforehand, while it is not necessary to convert the processing levels in the digital copying machines which have been requested to carry out the distributed processing.

Further, since the image processing is carried out by the digital copying machine 92 itself that has requested the distributed processing to the other digital copying machines, the image data to be processed by the digital copying machine 92 itself eliminate the necessity to be transmitted and received to and from the other digital copying machines. Accordingly, this causes (1) to shorten the time required for processing by the time required for separately transmitting and receiving such image data and (2) to simplify the cummunication procedures.

As the foregoing case, note that it is preferable to set the processing level to the lowest level of the processing levels that the digital copying machines 92 and 93 have respectively. Note also that it is preferable to set the processing level in accordance with a level of recording capacity of the digital copying machine 92 such as recording resolution.

The procedures shown in FIG. 17 deals with the arrangement wherein the image processing is carried out by the selected plural digital copying machines in a parallel manner. The procedures shown in FIG. 20 deals with the arrangement wherein the image processing is carried out in a parallel manner by (1) the digital copying machine that has requested the other digital copying machines to carry out the distributed processing and (2) the selected digital copying machines that have been requested to carry out the distributed processing. However, it may be possible to select a plurality of digital copying machines that should carry out image processing among the digital copying machines including the digital copying machine that requests the distributed processing so that these plural selected digital copying machines carry out the image processing. In such a case, in the operations at S64 and at S104, the operations, in which a plurality of digital copying machines that should carry out the image processing are selected among the digital copying machines including the digital copying machine that requests the distributed processing, are carried out, respectively. As a result, when the selected digital copying machines do not include the digital copying machine that requests the distributed processing, the procedures thereafter are carried out in accordance with the procedures shown in FIG. 17. In contrast, when the selected digital copying machines include the digital copying machine that requests the distributed processing, the procedures thereafter are carried out in accordance with the procedures shown in FIG. 20.

Note that the foregoing description deals with the case where "sharpness" processing is carried out as image processing. However, the present invention is not limited to this case, i.e., it is possible to adapt to the case where other kind of image processing is carried out as the image processing.

Third Embodiment

Figure 21:
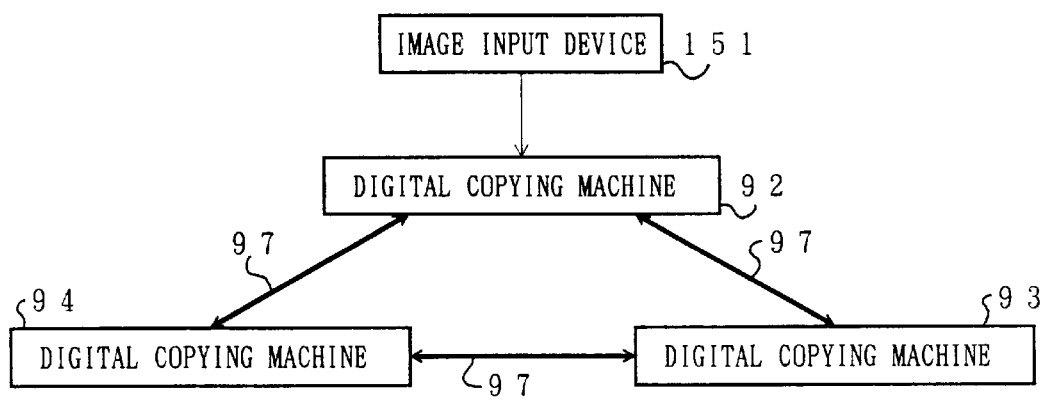
FIG. 21 is a flow chart showing an operation of a further embodiment in accordance with the present invention.
Figure 22:
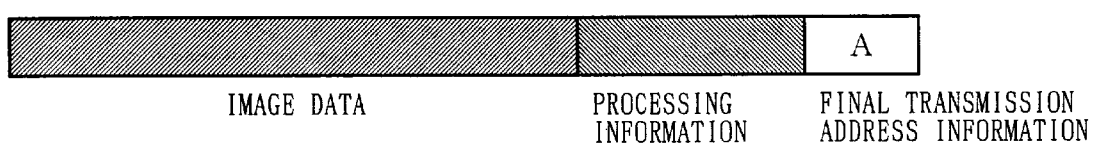
FIG. 22 is an explanatory view showing a structure of information that is used during the operation of the image forming system shown in FIG. 21.

The following description deals with a further embodiment in accordance with the present invention with reference to FIG. 11, and FIGS. 21 and 22.

According to the present image forming system, it is arranged as shown in FIG. 11, for example. More specifically, the present image forming system is arranged so that, when an image processing is instructed in a predetermined digital copying machine, the image processing is carried out by a plurality of digital copying machines in a distributed manner as described in the foregoing embodiments. Further, each of digital copying machines 91 through 94 is arranged so that, in the case where a selected digital copying machine can not carry out the image processing due to some reasons when having been requested to carry out the image processing in a distributed manner, it is possible to request another digital copying machine to carry out such an image processing.

A digital copying machine can not carry out the image processing when some troubles occur in the digital copying machine or when the digital copying machine has been carrying out another image processing. It is likely that a digital copying machine may not carry out an image processing due to settings in the image forming system or due to settings of priority conditions by which processings are carried out.

The following description deals with the operations of the present image forming system with reference to FIGS. 21 and 22. For example, when an image input device 151 (image information input means) transmits image data to a digital copying machine 92 (see FIG. 21) so as to instruct the digital copying machine 92 to carry out a predetermined image processing, the present image forming system carries out one of the foregoing operations for the predetermined image processing. Note that the image input device 151 is a scanner section 31 of a microcomputer or a word processor that is connected to the digital copying machine 92, or a scanner section 31 of the digital copying machine 92 itself.

During the operations of the foregoing image forming system, one part of the image data that has been inputted to the digital copying machine 92 is transmitted to the other digital copying machines. In such a case, with respect to the image data to be transmitted, (1) processing information indicative of the type of image processing to be carried out and (2) final transmission address information indicative of a digital copying machine to which the processed image data is finally transmitted (see FIG. 22).

When a digital copying machine which has been requested to carry out the foregoing image processing, i.e., the digital copying machine 93 can not carry out the image processing, a further digital copying machine, i.e., the digital copying machine 94 is requested to carry out the image processing. When the digital copying machine 94 can carry out the image processing, the digital copying machine 94 carries out the instructed image processing with respect to the image data in accordance with the processing information. Thereafter, the digital copying machine 94 transmits, in accordance with the final transmission address information, the image data that has been processed to the digital copying machine 92 that has requested to carry out the image processing and carries out the recording operation in accordance with the image data that has been processed.

With the arrangement, it is possible to return the image data that has been processed by the digital copying machine 94 to the digital copying machine 92 without transmitting to the digital copying machine 92 from the digital copying machine 93 that has requested the digital copying machine 94 to carry out the image processing. Accordingly, when a digital copying machine that has been requested to carry out an image processing can not carry out the image processing and a further or still a further digital copying machine etc. carries out the image processing instead, the image data that has been processed is quickly transmitted, in a simplified manner, to the digital copying machine to which the image data is finally transmitted.

Further, it is ensured that (1) the image data that has been processed is returned to the digital copying machine 92 that has been instructed to carry out the image processing directly by the operator and (2) the digital copying machine 92 carries out the recording of the image data that has been processed. Accordingly, the operator retrieves the image data that has been outputted with ease.

Fourth Embodiment

Figure 23:
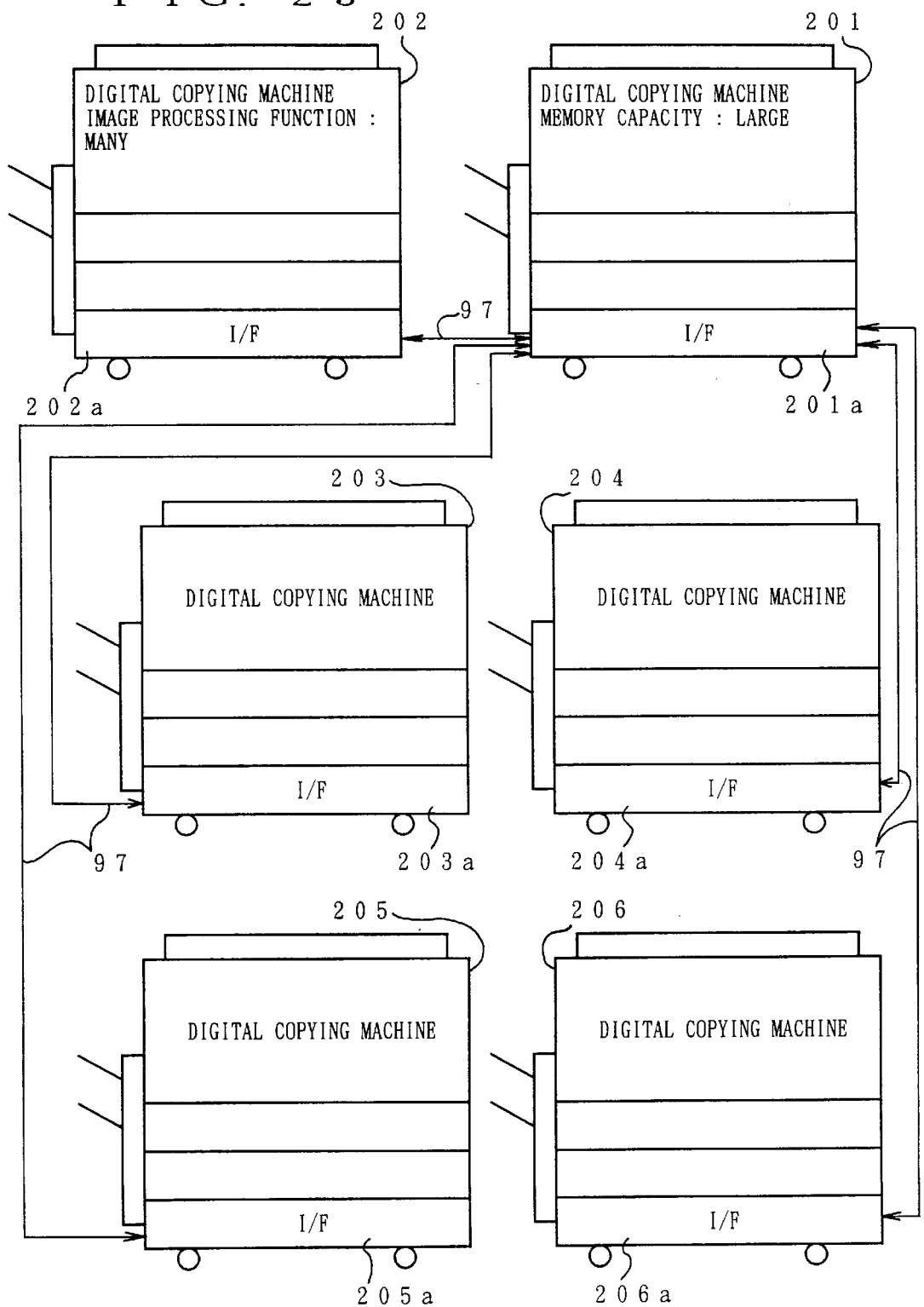
FIG. 23 is a schematic explanatory diagram showing a structure of an image forming system of a further embodiment in accordance with the present invention.
Figure 24:
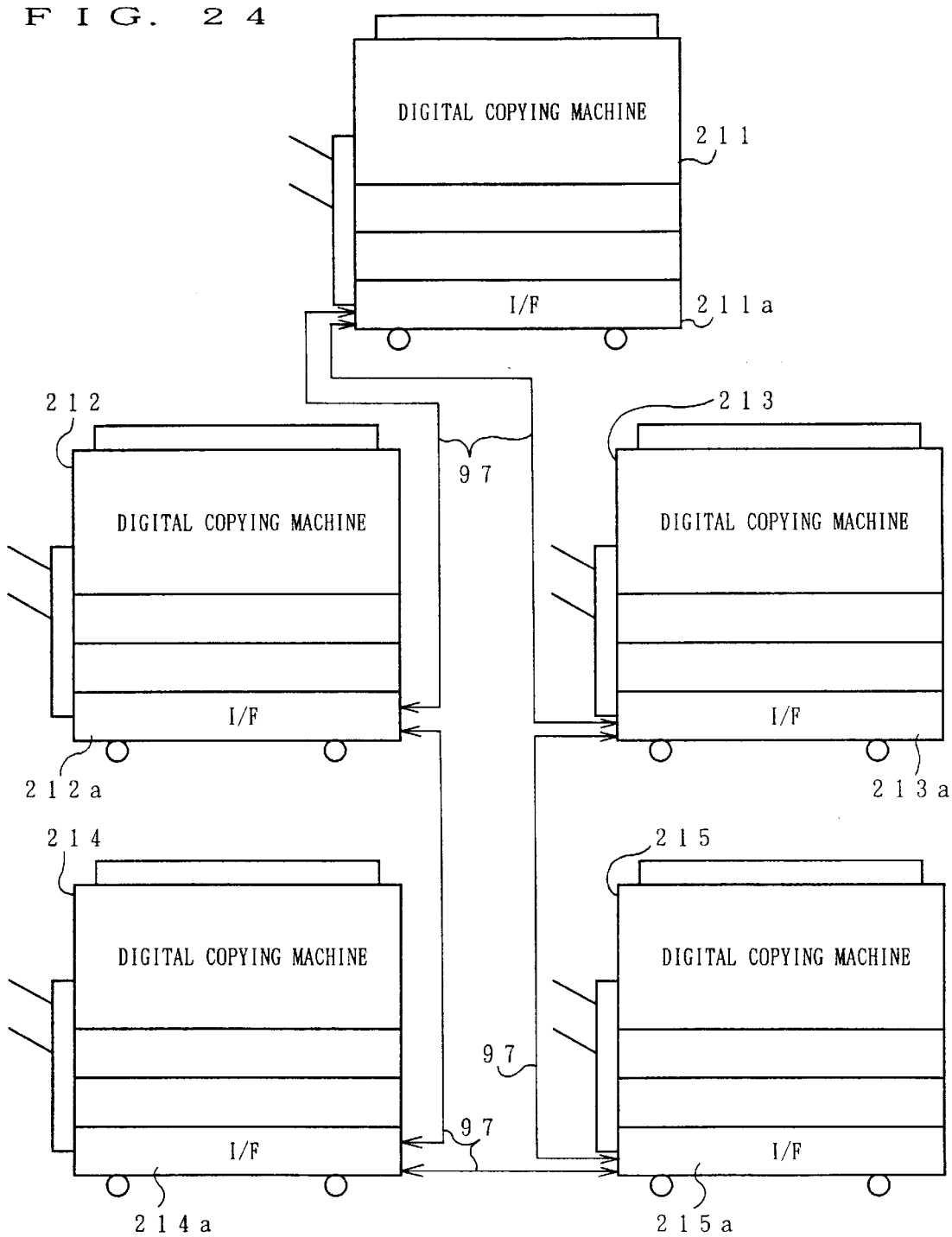
FIG. 24 is an explanatory view showing another example of the image forming system shown in FIG. 23.

The following description deals with still a further embodiment in accordance with the present invention with reference to FIGS. 23 and 24. Note that, for convenience, the same reference numerals are assigned to means that have the same functions as those shown in the drawings of the foregoing first embodiment, and the description thereof is omitted here.

The present image forming system, as shown in FIG. 23 is provided with, for example, six (6) digital copying machines 201 through 206 that have respective interfaces 201a through 206a for communicating with each other. Each of the digital copying machines 201 and 202 is a main digital copying machine as main image forming apparatus in the present image forming system. The digital copying machine 201 has a memory 73 with the largest memory capacity while the digital copying machine 202 has the most image processing functions.

The digital copying machine 201 (the second main image forming apparatus) and the digital copying machine 202 (the first main image forming apparatus) are operatively connected so as to communicate with each other through the interfaces 201a, 202a, and a telecommunication line 97. The digital copying machines 203 through 206 are operatively connected to the digital copying machine 201 so as to communicate with each other through the interfaces 201a, 203a to 206a, and the telecommunication line 97. The digital copying machines 202 through 206 are operatively connected to digital copying machines other than the digital copying machine 201 through the digital copying machine 201 so as to communicate with each other.

According to the present image forming system, it is possible to carry out the operations similar to the foregoing another image forming system. For example, the digital copying machine 202 has functions corresponding to those of the digital copying machine 94 shown in FIG. 11. The digital copying machine 201 has image processing functions corresponding to those of the digital copying machine 93 shown in FIG. 11, and has memory capacity of larger than that of the digital copying machine 93. The digital copying machines 203 and 204 have functions corresponding to those of the digital copying machine 92 while the digital copying machines 205 and 206 have functions corresponding to those of the digital copying machine 91.

The digital copying machines 201 and 202 as the main digital copying machine play their roles in a shared manner as follows. More specifically, the digital copying machine 201 manages the image data which mainly requires the memory 73 having the large capacity, while the digital copying machine 202 carries out the image processing. More concretely, for example, when receiving a request for carrying out an image processing from the digital copying machine 203, the image data transmitted from the digital copying machine 202 is temporarily stored in the memory 73 of the digital copying machine 201, and thereafter is sent one after another to the digital copying machine 202 for being subject to the image processing.

The image data that has been processed is stored again in the memory 73 of the digital copying machine 201, and thereafter is returned from the digital copying machine 201 to the digital copying machine 203. Such control is carried out by a PCU 74 of the digital copying machine 201, for example.

By thus arranging the main digital copying machine so that a plurality of digital copying machines play their roles in such a shared manner, it is possible to realize cost reduction and to improve the efficiency of the image forming system as compared to the case where the main digital copying machine, which requires high functions, is composed of only a single digital copying machine.

When the image processing is parallelly carried out in a distributed manner by (1) the main digital copying machine, i.e., the digital copying machines 201 and 202 and (2) other digital copying machines, it is possible to deliver the image data more to the main digital copying machine than to the other digital copying machines. This is because the main digital copying machine has the large memory capacity and can carry out the processing with high efficiency.

Note that an image forming system in accordance with the present embodiment may be arranged as follows.

More specifically, as shown in FIG. 24, for example, five (5) digital copying machines 211 through 215 that have respective interfaces 211a through 215a for communicating with each other. The digital copying machines 211 through 215 are operatively connected with each other through the respective interfaces 211a through 215a and a telecommunication line 97 so as to provide a loop network. Each of the digital copying machines 211 through 215 has a structure corresponding to the foregoing digital copying machine 30, for example.

According to the present image forming system, when each of the digital copying machines 211 through 215 does not have a target image processing function, such a target image processing function is carried out by anoother digital copying machine that has been requested to do so. Therefore, each of the digital copying machines 211 through 215 has (1) image processing functions that the other digital copying machines have and (2) information such as memory capacity of each digital copying machine. According to the requesting operations during the foregoing image processing, it is possible for each digital copying machine to automatically select digital copying machines which are requested to carry out the target image processing or it is possible for the operator to select target digital copying machines among the digital copying machines, that can carry out the target image processing, displayed on each liquid crystal display 1.

The present image forming system is arranged so as to be able to carry out the respective operations similar to those of the foregoing another image forming system.

The foregoing description deals with the case where the image output means for outputting image information that has been image-processed is the laser printer section 32. However, the present invention is not limited to the case, i.e., a display apparatus such as a liquid crystal display that displays image information, for example, may be substituted for the laser printer section 32.

There are described above novel features which the skilled man will appreciate give rise to advantages. These are each independent aspects of the invention to be covered by the present application, irrespective of whether or not they are included wihtin the scope of the following claims.

What is claimed is:

1. An image forming system comprising:
    a first image forming apparatus;
    a plurality of second image forming apparatuses;
    a communication apparatus that operatively connects said first image forming apparatus and said second image forming apparatuses so as to communicate image information with each other; and
    a memory apparatus that stores image processing information and image processing capacity information, the image processing information indicative of which types of image processing said second image forming apparatuses can carry out, the image processing capacity information indicative of processing capacity levels of the image processing,
    wherein said first image forming apparatus includes:
        an image output section that provides a visualized image in accordance with the image information;
        an input section through which instructions with regard to the image processing are inputted; and
        a first control section that (1) specifies in accordance with the image processing information and the image processing capacity information, with respect to the image processing that has been instructed by said input section, a permissible range of the processing capacity levels common to said second image forming-apparatuses, (2) divides the image information for said specified second image forming apparatuses and adds a control information to each divided image information, the control information indicative of the processing capacity level that has been instructed and which type of image processing should be carried out, (3) transmits said each divided image information to each of said second image forming apparatuses separately through said communication apparatus, and (4) sends to said image output section image information that has been processed and returned by each of said second image forming apparatuses, and
    each of said second image forming apparatuses includes:
        an image processing section that carries out, with respect to the image information, the image processing that has been specified in accordance with the control information with the processing capacity level that falls within the permissible range specified by said first control section;
        a second control section that (1) sends to said image processing section the image information that has been inputted through said communication apparatus, and (2) returns through said communication apparatus to said first image forming apparatus the image information that has been processed by said image processing section.

2. The image forming system as set forth in claim 1, further comprising image information input means, operatively connected to said first image forming apparatus, for inputting image information,
    wherein said first control section of said first image forming apparatus further adds final transmission address information to image information that is transmitted from said first image forming apparatus to said second image forming apparatus, the final transmission address information indicative of an image forming apparatus to which image information that has been processed should be finally transmitted, and
    each of said second image forming apparatus further transmits to another one of said second image forming apparatuses the image information inputted through said communication apparatus when said each second image forming apparatus can not carry out the image processing.

3. The image forming system as set forth in claim 1, wherein said first control section of said first image forming apparatus specifies, among the processing capacity levels, a lowest one as the processing capacity level of the control information common to said second image forming apparatuses with respect to the image processing that has been instructed by said input section.

4. The image forming system as set forth in claim 1, wherein said first control section of said first image forming apparatus specifies the processing capacity level of the control information in accordance with an output capacity level of said image output section of said first image forming apparatus.

5. An image forming system comprising:

a first image forming apparatus;

at least one second image forming apparatuses;

a communication apparatus that operatively connects said first image forming apparatus and said second image forming apparatuses so as to communicate image information with each other; and a memory apparatus that stores image processing information and image processing capacity information, the image processing information indicative of which types of image processing said first and second image forming apparatuses can carry out, the image processing capacity information indicative of processing capacity levels of the image processing, wherein said first image forming apparatus includes:

a first image processing section that carries out, with respect to the image information, the image processing that has been specified in accordance with control information with the processing capacity level that falls within the permissible range specified by said control information;

an image output section that provides a visualized image in accordance with the image information;

an input section through which instructions with regard to the image processing are inputted; and a first control section that (1) specifies in accordance with the image processing information and the image processing capacity information, and respect to the image processing that has been instructed by said input section, a permissible range of the processing capacity levels common to said first and second image forming apparatuses, (2) divides the image information for the first image forming apparatus and the second image forming apparatuses that can carry out the image processing and adds a control information to each divided image information, the control information indicative of the processing capacity level that has been instructed and which type of image processing should be carried out, (3) transmits one part of said divided image information to said first image processing section while transmitting the remainder of said divided image information to said second image forming apparatuses through said communication apparatus, and (4) send to said image output section (a) image information that has been processed and returned by each of said second image forming apparatuses and (b) image information that has been processed by said first image processing section, and each of said second image forming apparatuses includes:

a second image processing section that caries out, with respect to image information, the image processing that has been specified in accordance with the control information with the processing capacity level that falls within the permissible range specified by said first control section;

a second control section that (1) sends to said second image processing section the image information that has been inputted through said communication apparatus, and (2) returns through said communication apparatus to said first image forming apparatus the image information that has been processed by said second image processing section.

6. The image forming system as set forth in claim 5, further comprising image information input means, operatively connected to said first image forming apparatus, for inputting image information, wherein said first control section of said first image forming apparatus further adds final transmission address information to image information that is transmitted from said first image forming apparatus to said second image forming apparatus, the final transmission address information indicative of an image forming apparatus to which image information that has been processed should be finally transmitted, and each of said second image forming apparatus further transmits to another one of said second image forming apparatuses the image information inputted through said communication apparatus when said each second image forming apparatus can not carry out the image processing.

7. The image forming system as set forth in claim 5, wherein said first control section of said first image forming apparatus specifies, among the processing capacity levels, a lowest one as the processing capacity level of the control information common to said second image forming apparatuses with respect to the image processing that has been instructed by said input section.

8. The image forming system as set forth in claim 5, wherein said first control section of said first image forming apparatus specifies the processing capacity level of the control information in accordance with an output capacity level of said image output section of said first image forming apparatus.

9. An image forming system comprising:

a first image forming apparatus;

a plurality of second image forming apparatuses;

a communication apparatus that operatively connects said first image forming apparatus and said second image forming apparatuses so as to communicate image information with each other; and a memory apparatus that stores image processing information and image processing capacity information, the image processing information indicative of which types of image processing said second image forming apparatuses can carry out, the image processing capacity information indicative of processing capacity levels of the image processing, wherein said first image forming apparatus includes:

an image output section that provides a visualized image in accordance with the image information;

an input section through which instructions with regard to the image processing are inputted; and a first control section that (1) selects, in accordance with the image processing information and the image processing capacity information, some of said second image forming apparatuses that can carry out an image processing that has been instructed by said input section with the processing capacity levels falling within a permissible range, (2) divides the image information for said some selected second image forming apparatuses and transmits said each divided image information to each of said selected some second image forming apparatuses separately through said communication apparatus, and (3) sends to said image output section image information that has been processed and returned by each of said selected some second image forming apparatuses, and each of said second image forming apparatuses includes:

an image processing section that carries out an image processing with respect to the image information;

a second control section that (1) sends to said image processing section the image information that has been inputted through said communication apparatus, and (2) returns through said communication apparatus to said first image forming apparatus the image information that has been processed by said image processing section.

10. The image forming system as set forth in claim 9, further comprising image information input means, operatively connected to said first image forming apparatus, for inputting image information, wherein said first control section of said first image forming apparatus further adds final transmission address information to image information that is transmitted from said first image forming apparatus to said second image forming apparatus, the final transmission address information indicative of an image forming apparatus to which image information that has been processed should be finally transmitted, and each of said second image forming apparatus further transmits to another one of said second image forming apparatuses the image information inputted through said communication apparatus when said each second image forming apparatus can not carry out the image processing.

11. The image forming system as set forth in claim 9, wherein said first control section of said first image forming apparatus specifies the processing capacity level that falls within the permissible range in accordance with an output capacity level of said image output section of said first image forming apparatus.

12. An image forming system comprising:

a first image forming apparatus;

a plurality of second image forming apparatuses;

a communication apparatus that operatively connects said first image forming apparatus and said second image forming apparatuses so as to communicate image information with each other; and a memory apparatus that stores image processing information and image processing capacity information, the image processing information indicative of which types of image processing said first and second image forming apparatuses can carry out, the image processing capacity information indicative of processing capacity levels of the image processing, wherein said first image forming apparatus includes:

an image output section that provides a visualized image in accordance with the image information;

a first image processing section that carries out the image processing with respect to the image information;

an input section through which instructions with regard to the image processing are inputted; and a first control section that (1) selects, in accordance with the image processing information and the image processing capacity information, at least one of said second image forming apparatuses that can carry out an image processing that has been instructed by said input section with processing capacity levels falling within a permissible range of a processing level that said first image processing section has, (2) divides the image information for said first image forming apparatus and said selected second image forming apparatuses and transmits one part of said divided image information to said first image processing section while transmitting the remainder of said divided image information to said selected second image forming apparatuses through said communication apparatus, and (3) sends to said image output section (a) image information that has been processed and returned by each of said selected second image forming apparatuses and (b) image information that has been processed by said first image processing section, and each of said second image forming apparatuses includes:

a second image processing section that carries out the image processing with respect to image information;

a second control section that (1) sends to said second image processing section the image information that has been inputted through said communication apparatus, and (2) returns through said communication apparatus to said first image forming apparatus the image information that has been processed by said second image processing section.

13. The image forming system as set forth in claim 12, further comprising image information input means, operatively connected to said first image forming apparatus, for inputting image information, wherein said first control section of said first image forming apparatus further adds final transmission address information to image information that is transmitted from said first image forming apparatus to said second image forming apparatus, the final transmission address information indicative of an image forming apparatus to which image information that has been processed should be finally transmitted, and each of said second image forming apparatus further transmits to another one of said second image forming apparatuses the image information inputted through said communication apparatus when said each second image forming apparatus can not carry out the image processing.

14. The image forming system as set forth in claim 12, wherein said first control section of said first image forming apparatus specifies the processing capacity level that falls within the permissible range in accordance with an output capacity level of said image output section of said first image forming apparatus.

15. an image forming system comprising:

a first image forming apparatus;

a plurality of second image forming apparatuses;

a communication apparatus that operatively connects said first image forming apparatus and said second image forming apparatuses so as to communicate image information with each other; and a memory apparatus that stores image processing information and image processing capacity information, the image processing information indicative of which types of image processing said first and second image forming apparatuses can carry out, the image processing capacity information indicative of processing capacity levels of the image processing, wherein said first image forming apparatus includes:

an image output section that provides a visualized image in accordance with the image information;

a first image processing section that carries out the image processing with respect to the image information;

an input section through which instructions with regard to the image processing are inputted; and a first control section that (1) selects, in accordance with the image processing information and the image processing capacity information, the first image forming apparatus and some of said second image forming apparatuses that can carry out an image processing that has been instructed by said input section with processing capacity levels falling within a permissible range, (2) divides the image information for said selected first image forming apparatus and some of said second image forming apparatuses, (3) transmits one part of the divided image information to the first image processing section and transmits the remainder of the divided image information to the second image forming apparatuses through the communication apparatus when the first image forming apparatus and second image forming apparatuses have been selected, while separately transmitting each of the divided image information for the selected second image forming apparatuses to the selected second image forming apparatuses through the communication apparatus when only some of the second image forming apparatuses have been selected, and (4) sends to the image output section (a) image information that has been processed and returned by each of the selected some second image forming apparatuses and (b) image information that has been processed by the first image processing section, and each of said second image forming apparatuses includes:

a second image processing section that caries out the image processing with respect to image information;

a second control section that (1) sends to said second image processing section the image information that has been inputted through said communication apparatus, and (2) returns through said communication apparatus to said first image forming apparatus the image information that has been processed by said second image processing section.

16. The image forming system as set forth in claim 15, further comprising image information input means, operatively connected to said first image forming apparatus, for inputting image information, wherein said first control section of said first image forming apparatus further adds final transmission address information to image information that is transmitted from said first image forming apparatus to said second image forming apparatus, the final transmission address information indicative of an image forming apparatus to which image information that has been processed should be finally transmitted, and each of said second image forming apparatus further transmits to another one of said second image forming apparatuses the image information inputted through said communication apparatus when said each second image forming apparatus can not carry out the image processing.

17. The image forming system as set forth in claim 15, wherein said first control section of said first image forming apparatus specifies the processing capacity level that falls within the permissible range in accordance with an output capacity level of said image output section of said first image forming apparatus.

* * * * *